(12) United States Patent
Gordon et al.

(10) Patent No.: US 8,370,401 B2
(45) Date of Patent: Feb. 5, 2013

(54) MERGING CONTAINERS IN A MULTI-CONTAINER SYSTEM

(75) Inventors: Colin Stebbins Gordon, Ridgefield, CT (US); Pratap Vikram Singh, Fremont, CA (US); Donald Alvin Trimmer, Livermore, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 12/912,436

(22) Filed: Oct. 26, 2010

(65) Prior Publication Data

US 2011/0040795 A1    Feb. 17, 2011

Related U.S. Application Data

(62) Division of application No. 11/796,266, filed on Apr. 27, 2007, now Pat. No. 7,827,201.

(51) Int. Cl.
G06F 7/00 (2006.01)
G06F 12/00 (2006.01)
G06F 17/30 (2006.01)

(52) U.S. Cl. .................. 707/808; 707/809; 707/822

(58) Field of Classification Search .......... 707/808, 707/999.001–999.005
See application file for complete search history.

(56) References Cited

U.S. PATENT DOCUMENTS

| | | | |
|---|---|---|---|
| 4,775,969 A | 10/1988 | Osterlund | |
| 5,450,581 A * | 9/1995 | Bergen et al. | 707/999.009 |
| 5,454,103 A | 9/1995 | Coverston et al. | |
| 5,717,951 A * | 2/1998 | Yabumoto | 707/999.1 |
| 5,930,828 A | 7/1999 | Jensen et al. | |
| 6,434,553 B1 * | 8/2002 | Sekiguchi et al. | 707/999.002 |
| 6,571,261 B1 * | 5/2003 | Wang-Knop et al. | 707/999.1 |
| 6,728,831 B1 * | 4/2004 | Bridge | 711/112 |
| 6,934,725 B1 * | 8/2005 | Dings | 707/610 |
| 7,107,385 B2 | 9/2006 | Rajan et al. | |
| 7,386,559 B1 * | 6/2008 | Desai et al. | 707/999.101 |
| 7,434,091 B1 | 10/2008 | Karr | |
| 7,549,037 B1 * | 6/2009 | Kale et al. | 711/218 |
| 7,676,628 B1 | 3/2010 | Compton et al. | |
| 2002/0035705 A1 | 3/2002 | Ando et al. | |
| 2002/0056031 A1 | 5/2002 | Skiba et al. | |
| 2002/0161850 A1 | 10/2002 | Ulrich et al. | |
| 2002/0169827 A1 | 11/2002 | Ulrich et al. | |

(Continued)

FOREIGN PATENT DOCUMENTS

WO    WO 03/009180 A2    1/2003

OTHER PUBLICATIONS

Shapiro, Michael, et al., "Managing Databases with Binary Large Objects," Mass Storage Systems, 1999. 16th IEEE Symposium on San Diego, CA, USA, Mar. 15-18, 1999, Piscataway, NJ, USA, IEEE., US, Mar. 15, 1999, XP010376278, ISBN: 978-0-7695-0204-5, pp. 185-193.

(Continued)

*Primary Examiner* — Jacob F Bétit
*Assistant Examiner* — Kannan Shanmugasundaram
(74) *Attorney, Agent, or Firm* — Blakely, Sokoloff, Taylor & Zafman LLP

(57) ABSTRACT

An apparatus and method for merging the data of a first container and a second container into a target container that includes at least one block having a plurality of extents to store data objects. The apparatus may include a storage sever coupled to a plurality of storage devices. The storage server is configured to merge multiple data objects of the plurality of containers that store a data object per each container into a target container that stores multiple data objects within the target container.

27 Claims, 13 Drawing Sheets

U.S. PATENT DOCUMENTS

| | | |
|---|---|---|
| 2003/0135660 A1 | 7/2003 | Mortazavi |
| 2003/0140210 A1 | 7/2003 | Testardi |
| 2004/0030822 A1 | 2/2004 | Rajan et al. |
| 2004/0133602 A1 | 7/2004 | Kusters et al. |
| 2004/0181558 A1* | 9/2004 | Williams et al. .............. 707/200 |
| 2005/0187985 A1 | 8/2005 | Edwards et al. |
| 2005/0283489 A1 | 12/2005 | Shiozawa et al. |
| 2006/0126615 A1 | 6/2006 | Angtin et al. |
| 2006/0288047 A1 | 12/2006 | Chron et al. |
| 2006/0294039 A1* | 12/2006 | Mekenkamp et al. ............ 707/1 |
| 2007/0150689 A1 | 6/2007 | Pandit et al. |
| 2008/0077590 A1 | 3/2008 | Pandit et al. |

OTHER PUBLICATIONS

"Reiser4 is released!," downloaded from http://www.namesys.com/v4/v4.html, Oct. 5, 2006.

* cited by examiner

MERGING CONTAINERS IN A MULTI-CONTAINER SYSTEM

RELATED APPLICATIONS

This application is a divisional application of U.S. patent application Ser. No. 11/796,266, filed on Apr. 27, 2007, entitled "Merging Containers in a Multi-Container System," by Colin Stebbins Gordon et al, which is commonly assigned to the present assignee and hereby incorporated by reference.

TECHNICAL FIELD

This invention relates to the field of data storage systems and, in particular, to referencing data objects within containers in the data storage system.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). Enterprise-level filers are made by Network Appliance, Inc. of Sunnyvale, Calif.

In a SAN context, the storage server provides clients with block-level access to stored data, rather than file-level access. Some storage servers are capable of providing clients with both file-level access and block-level access, such as certain Filers made by Network Appliance of Sunnyvale, Calif.

Conventional file systems include data sets, such as volumes, files (also referred to as containers), or logical data storage units. A file system is a hierarchy of the stored data sets. A file system layer or manager is an application-level programmatic entity or layer which imposes the hierarchal structure on the data sets, such as the files, directories and/or other data containers stored and/or managed by a storage server, and which services read and write requests from clients of the storage server. Conventionally, a logical data container may be another type of a logical storage object, since one data object is stored per container. One type of data storage unit is a logical unit number (LUN). A LUN may be a virtual partition of a RAID group. For example, a LUN may be formed as a "stripe" that is one or more blocks wide, across the storage devices in a RAID group, where a block may be, for example, a 4 Kbyte chunk of storage space. A block is the fundamental unit of storage space that the file system layer can maintain. A LUN may appear to a client, for practical purposes, as a physical storage device such as a disk. For example, a volume may include a file system.

A volume is a logical data set which is an abstraction of physical storage, combining one or more physical storage devices or parts thereof into a single logical storage object, and which is managed as a single administrative unit, such as single file system. A volume may be defined from a larger group of available storage, such as an aggregate. A volume may be logically broken down into logical data sets (storage objects) called "plexes," which may contain one or more RAID groups. A file system includes directories and files (also referred to as a container or logical unit number). Data is stored in one or more blocks within the container. This data is typically stored as data objects, one data object per container, and the data may fill one or more blocks of the container.

When storing files in a conventional file system, the total disk space consumed is frequently more than what the file itself requires. Conventional file systems are subject to an internal block fragmentation that dictates the size of each block. When the size of the stored data objects is less than the underlying block size of the file system, space in the file system is wasted or unused due to the internal block fragmentation. For example, storing a 3K file on a file system using 4K blocks uses up a minimum of 4K, leaving 1K unused. For storing large numbers of small objects, this is very inefficient use of storage space. In a conventional file system that stores a large number of objects, such as, for example, 100 billion emails of each 2 KB or less, more than half the space of the file system is unused due to the internal block fragmentation (e.g., 4 KB) of the file system, since most of the data objects are smaller than half the size of each block.

The problem may become considerably worse when considering how many inodes are reserved per unit of disk space. Inodes are used in a directory that may be accessed for referencing the data objects. Creating a large number of data objects in a file system can use up all inode resources and put additional stress on the directory lookup performance in referencing data objects. An inode is a metadata structure which is used to store metadata about a file, such as ownership of the file, access permission for the file, size of the file, file type, and pointers used to locate the data blocks for the file. Inodes contain pointers to the top level of indirect blocks for the file, such as for example, in a buffer tree. The inode is stored in a separate inode file. The inode file is a file which contains the inodes of all files (or containers) in a particular volume. Each inode includes a list of block(s) that contain the data object of the file, and where the data is located on the storage devices. Having a filename, a user, or an application can find the corresponding inode, which references where the file is physically located on the storage devices.

Also, it should be noted that each directory is a special kind of file that includes a list of filename(s) and the disk address of the inodes of these files. A directory may include a list of all the files that are within that directory, and each file includes the disk address of the inode of that directory. The inode includes the physical location of the file on the storage server. For example, for each file that is created 100-200 bytes, for example, are used to create an inode for that file. When storing a large number of data objects, additional space may be used to store the inodes for each of the files that include one data object per file. Conventional file systems that support high capacities, such as large files and/or large number of files, typically require a substantial fraction of the storage to be consumed by per-file metadata structures, because the data objects are stored on one-data-object-per-one-file model. For example, if no more inodes are allowed by the file system than one per 32K of space, then storing a 3K file as an individual file effectively requires 32K of on-disk space. However, changing the block size or inode allocations of the underlying file system is frequently not possible.

Conventional file systems typically access a particular object by referencing the particular container (or file) that includes the data object, since each object corresponds to the container in which it is stored. This may be done by using a table or map, which includes mappings between the filename, as known to the outside world, and the container identification, which indicates the physical location of the data on the storage devices.

Another conventional design of databases may use a packing approach to address the storage of small records in a large table; however, these databases are for internal use and are not available to the user for general purpose storage use. A database typically stores multiple records in a single table. The tables is then stored in a single file or volume. For example, in storing a collection of social security numbers, each number occupying nine bytes, it would be very inefficient to store each number in a separate file. Instead, the database typically packs a large number of social security numbers together in a table and stores the result in a single file or volume.

SUMMARY OF INVENTION

Described herein are an apparatus and method that references physical location of data objects stored within a logical container. Also described herein are an apparatus and method for merging the data of a first container and a second container into a target container. The method may include receiving an access request from a client for a particular data object stored in a logical container having a plurality of data objects stored collectively in the logical container, and referencing a physical location of the particular data object within the logical container in response to the access request. The method may also include receiving a merge request to merge a first logical container and a second logical container, each including a data object, and merging the first and second data objects of the first and second logical containers into a target container. The apparatus may include a plurality of storage devices coupled to a storage server. The storage server is configured to merge multiple data objects of the plurality of containers that store a data object per each container into a target container that stores multiple data objects within the target container. When merging or repacking containers, some of the data objects may not be copied to the target container.

BRIEF DESCRIPTION OF THE DRAWINGS

The present invention is illustrated by way of example, and not by way of limitation, in the figures of the accompanying drawings.

DETAILED DESCRIPTION

Figure 1:
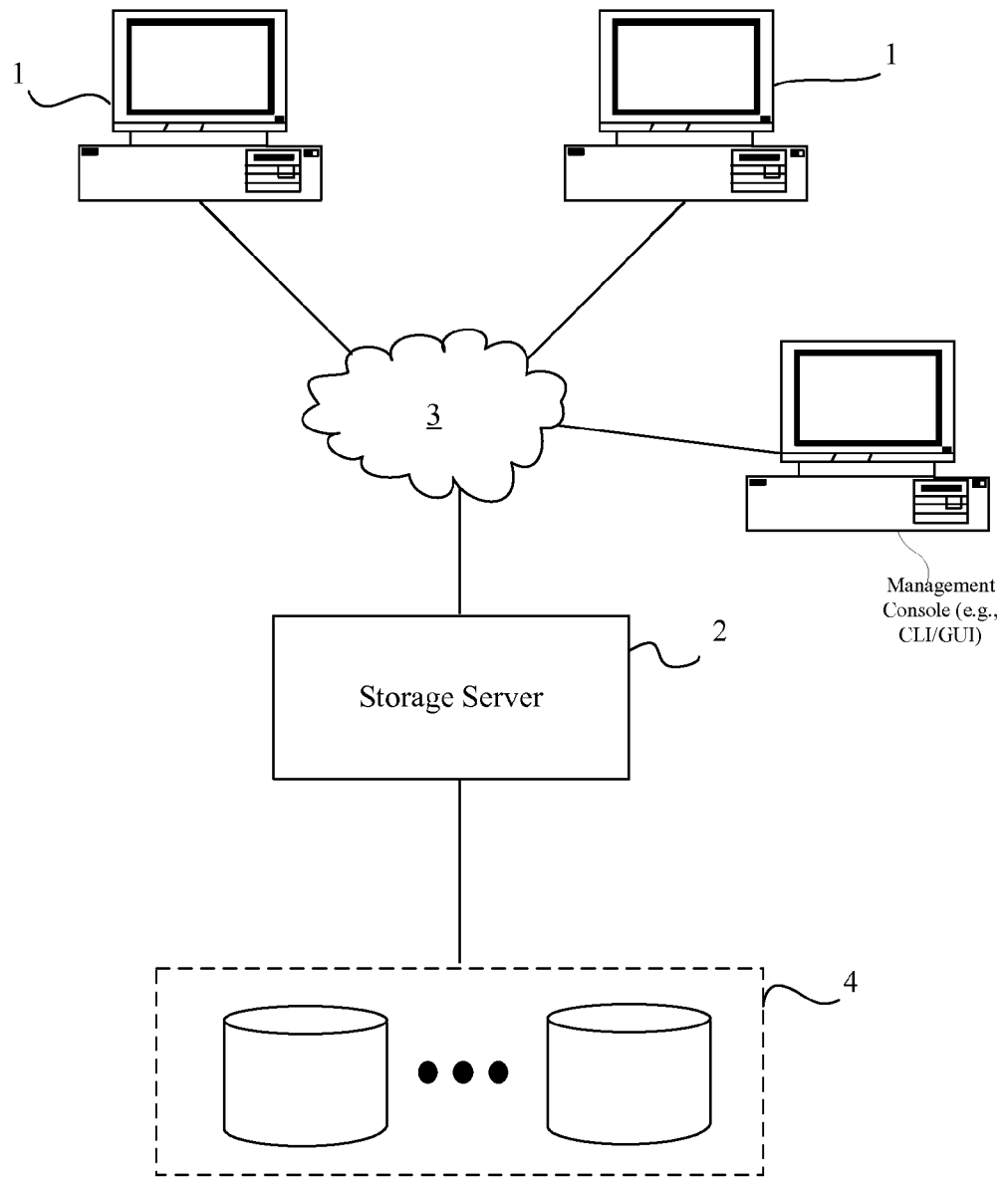
FIG. 1 illustrates a storage network environment.

Described herein are apparatuses and methods for containerization of multiple data objects within a single container. Containerization is the packing of multiple data objects into a logical container, instead of storing each of the multiple data objects in separate logical containers. Also described herein are apparatuses and methods for accessing multiple logical containers and multiple data objects stored within a single container. Also described herein are apparatuses and methods for merging two or more containers that have unused space due to internal container fragmentation.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to facilitate understanding of the present invention. Thus, the specific details set forth are merely exemplary. Particular implementations may vary from these exemplary details and still be contemplated to be within the spirit and scope of the present invention.

Overview

Containerization

As described above, storing files on a file system, the total disk space consumed is frequently more than what the file itself needs, due to the internal block fragmentation and the amount of disk space reserved for each file's inode. The embodiments described herein include an apparatus and method for packing data objects into containers to improve the space utilization in an underlying file system by not wasting space within the containers due to internal block fragmentation (e.g., by reducing the amount of unused space in blocks of a container) and to reduce the amount of space required to store per-file metadata. A block is the fundamental unit of storage space that the file system layer maintains. However, as described herein the blocks can be divided into multiple extents for storing multiple data objects within a block, allowing the extents to be the smallest unit of storage space. The storage space within the logical container is maintained by the containerization layer, or by the file system layer that includes the containerization functionality. The embodiments described herein may also reduce the overhead to backup one or more containers of the plurality of containers that are not entirely filled with data objects. The embodiments described herein allow the use of an arbitrary number of data objects and provides fast access and efficient space utilization. These embodiments may be beneficial for a data storage system that has data sets that waste a lot of resources in the underlying file system due to the internal block fragmentation of the file system. This also may enable the creation of a large number of objects without stressing the limits of the file system. As described above, the file system is a hierarchy of the stored data sets, and the file system layer is an application-level programmatic entity (e.g., module or layer) which imposes a structure (e.g., hierarchical structure) on files, directories and/or other data containers stored and/or managed by a storage server, and which services read and write requests from client in the storage server.

The containerization embodiments described herein may be implemented within the operating system of a storage server as a set of interfaces that can be packaged into a library and linked to any application or an already existing file system layer of the operating system of the storage server. The library may include a custom set of commands that can access the data objects within the containers. These custom commands may be implemented transparently to the application or user. For example, the interface can receive the standard Portable Operating System Interface for UNIX (POSIX) file I/O system calls and convert them into the container commands to access particular data objects within the container. The family of POSIX standards is formally designated as IEEE 1003 and the international standard name is ISO/IEC 9945. This may allow containerization within the file system to occur transparently from the user or application that accesses the file system without learning the custom commands. Alternatively, the embodiments may be implemented in an application programming interface (API) interface (e.g., POSIX-based API) that is placed at the front end of each container, in effect, creating a file system within each container. The embodiments may also be integrated inside the file system layer of the operating system of a storage server as a new type of file system layer, which may result in some performance and consistency benefits. The new file system layer can include custom commands as part of the API. These custom commands may be similar to the POSIX file I/O system calls, but allow access to data objects within the container. Users and applications that access the data objects use these custom commands. The application may be executed on a client. The client in any given context could be an application server, a personal computer (PC), workstation, etc. An application server is a computer dedicated to running certain software applications. An application server may be configured to deliver applications to the clients, and may handle most, if not all, of the execution logic and data access of the application.

The embodiments described herein may reduce the unused space due to the internal block fragmentation of the file system when the size of the stored objects is less than the underlying block size of the file system. As described above, creating a large number of objects in a file system can use up all inode resources and put additional stress on the directory lookup performance. The embodiments described herein reduce the additional stress on the directly lookup performance by packing multiple containers into a single container, reducing the amount of space used to store per-file metadata. Also as described above, a file system that supports high capacities, large file and large numbers of files may use a substantial fraction of the storage to be consumed by per-file metadata structures. Packing multiple objects into containers (e.g., files) of appropriate size results in much less meta-data overhead per object than a one-data-object-per-one-file model.

The embodiments described herein may pack multiple data objects within regular files (also known as containers) that reside in any general purpose file system. "Containers" can be thought of as mini- or micro-file systems that have metadata to allow allocation and management of data objects. A micro-file system is a container that stores large amounts of small data objects in extents of the one or more blocks of the container. The embodiments described herein may be implemented as an overlay that hides the underlying block sizes of the file system, by creating virtual blocks of smaller sizes than the internal block size of the file system. The embodiments described herein may be implemented as a library which can be used as an interface to the containers and can be linked to any program. The capability can also be built inside an actual file system and exported via similar interfaces or a network protocol (e.g., file transfer protocol (FTP) interface).

Accessing Data Objects and Merging Containers

Also, described herein is an apparatus and method for referencing data objects within a container that includes multiple data objects and for merging multiple data objects of different containers into a single container. The embodiments described herein may be used to consolidate multiple, sparsely-filled containers. A container may need to be merged for various reasons. For example, the container has very few data objects resulting in a relatively high per object overhead. Also, the system that stores the container could be getting decommissioned or the number of containers is very large and thus makes the task of data protection very cumbersome. Alternatively, other reasons may warrant merging two or more containers. The embodiments described herein may be used to reduce the amount of unused space in maintaining the container, reduce the overhead in backing up the sparsely-filled containers, allow multiple containers to migrate from one physical location to another, and allow for upgrading or downgrading containers to different versions. The embodiments described herein may use a method to virtualize both locating a container and locating multiple data objects within the container. Conventionally, virtualization has only been done for locating containers, and not locating objects within containers. This virtualization provides a mechanism for enabling independent referencing of a container and objects within a container. The embodiments described herein also allow two or more containers to be merged. The embodiments described herein enable separately referencing of data objects within a container.

Storage Network Environment

FIG. 1 shows a network environment in which the invention can be implemented. A storage server 2 is coupled locally to storage devices 4, which includes multiple storage devices (e.g., disks). The storage server 2 is also coupled through a network 3 to a number of storage clients 1 (hereinafter simply "clients"). The storage devices 4 are managed by the storage server 2. The storage server 2 receives and responds to various read and write requests from the clients 1, relating to LUNs, files, or other units of data stored in (or to be stored in) the storage devices 4.

Each of the clients 1 may be, for example, a conventional personal computer (PC), workstation, or the like. The storage server 2 may be, for example, a file server used in a NAS mode (a "filer"), a block-based storage server such as used in a storage area network (SAN), a storage server which can perform both file-level access and block-level access for clients, or another type of storage server. The network 3 may be, for example, a local area network (LAN), a metropolitan area network (MAN), a wide area network (WAN), a global area network (GAN) such as the Internet, or other type of network or combination of networks. The network 3 may implement, for example, Ethernet protocol, Fibre Channel protocol, or another protocol or a combination of protocols.

The storage devices 4 may store data represented in an active file system of the storage server 2. The storage devices in the storage devices 4 may be, for example, conventional magnetic disks, optical disks such as CD-ROM or DVD based storage, magneto-optical (MO) storage, or any other type of non-volatile storage devices suitable for storing large quantities of data. The storage devices in the storage devices 4 can be organized as one or more RAID groups, in which case the storage server 2 accesses the storage devices 4 using an appropriate RAID protocol.

Figure 2:
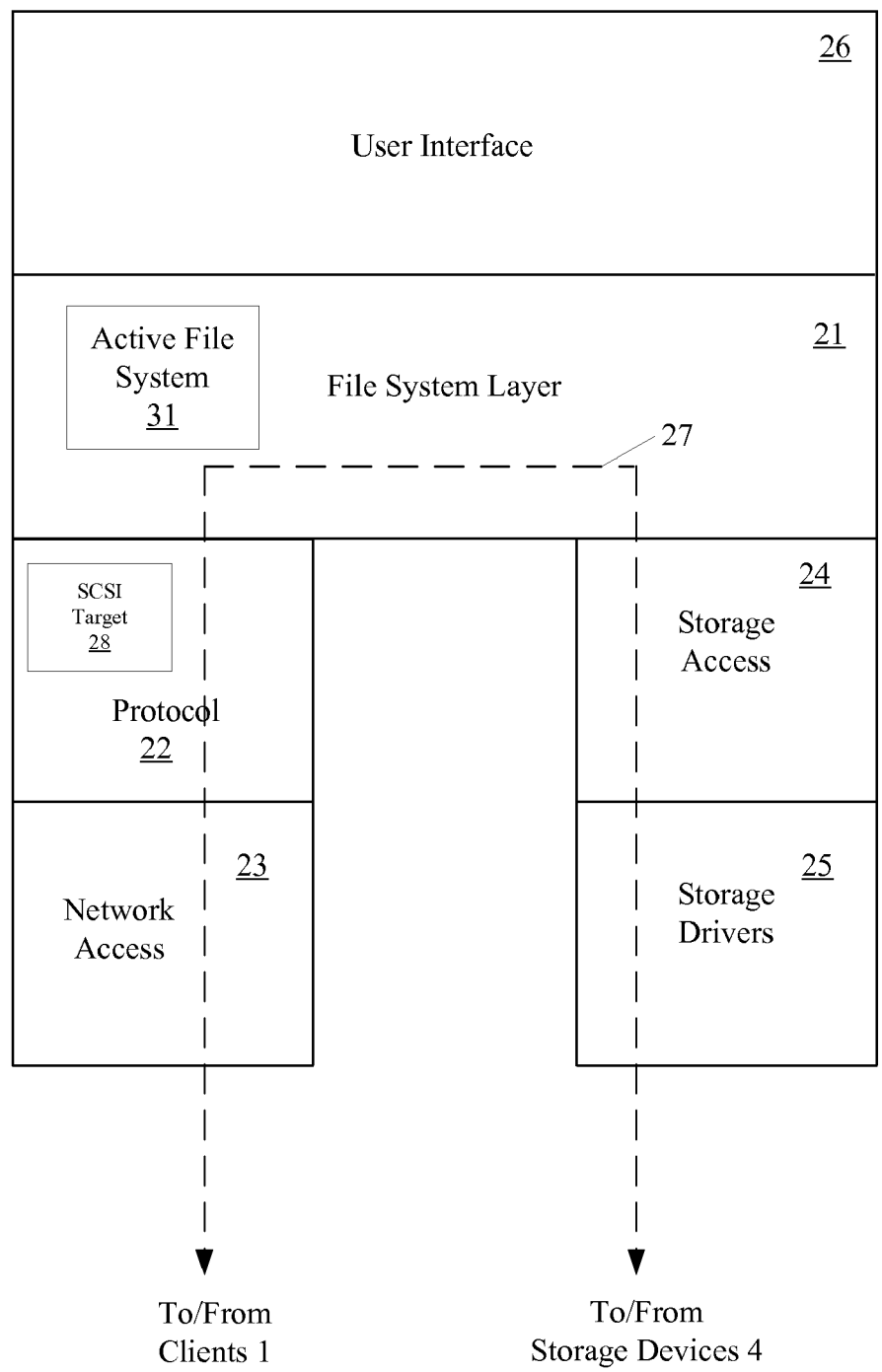
FIG. 2 illustrates one embodiment of an operating system of the storage server in FIG. 1.
Figure 3:
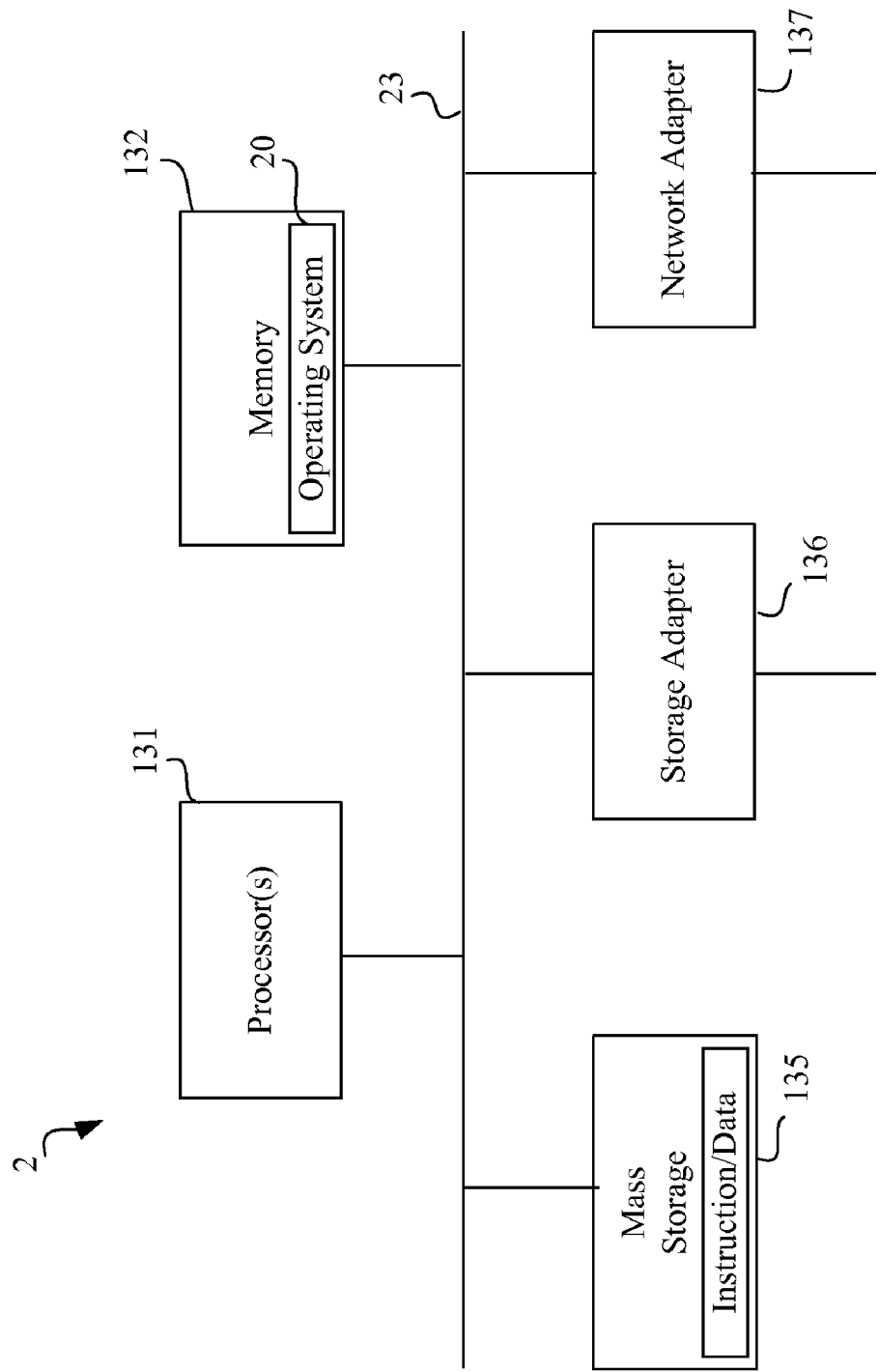
FIG. 3 is a high-level block diagram of the architecture of the storage server.

FIG. 2 shows one embodiment of the architecture of the operating system of the storage server 2. As shown, the operating system 20 includes several software modules, or "layers". These layers include a file system layer 21. The file system layer 21 is an application-level layer which imposes a structure, e.g. a hierarchy, on files and directories and/or other data containers stored by the storage server 2 and which services read/write requests from clients 1, among other functions. This hierarchy is referred to as the "active file system." Logically "under" the file system layer 21, the operating system 20 also includes a protocol layer 22 and an associated network access layer 23 to allow the storage server 2 to communicate over the network 3 (e.g., with clients 1). The protocol layer 22 implements various higher-level network protocols, such as Network File System (NFS), Common Internet File System (CIFS), Hypertext Transfer Protocol (HTTP) and/or Transmission Control Protocol/Internet Protocol (TCP/IP). In addition, assuming the storage server 2 is configured to operate in a SAN, the protocol layer 22 can also include a SCSI target layer, to enable the storage server 2 to receive and respond to SCSI I/O operations (i.e., read and writes). The network access layer 23 includes one or more drivers which implement one or more lower-level protocols to communicate over the network, such as Ethernet, Fibre Channel or Internet small computer system interface (iSCSI).

Also logically under the file system layer 21, the operating system 20 includes a storage access layer 24 and an associated storage driver layer 25, to allow the storage server 2 to communicate with the storage devices 4. The storage access layer 24 implements a higher-level disk storage protocol, such as an implementation of RAID, while the storage driver layer 25 implements a lower-level storage device access protocol, such as Fibre Channel Protocol (FCP) or small computer system interface (SCSI). Also shown in FIG. 2 is the path 27 of data flow, through the operating system 20, associated with a read or write operation.

The operating system 20 also includes a user interface layer 26 logically on top of the file system layer 21. The user interface layer 26 may provide a command line interface (CLI) and/or a graphical user interface (GUI) to various storage server functions, to allow an administrator to manage the storage server 2.

The storage server 2 has an active file system 31, which is created and managed by the file system layer 21 of the operating system 20. The active file system 31 includes a number of storage volumes 32, each of which may include one or more LUNs 33. It will be recognized that each volume 32 or LUN 33 can contain different data from that in any other volume or LUN, although volumes 32 and LUNs 33 can also be duplicates of each other. Each volume 32 represents a set of one or more physical storage devices, such as disks. A LUN 33 is a data container that is exported to a client 1 and which, from the perspective of a client 1, appears to be a storage device, such as a disk. However, each LUN 33 is actually stored as a file in the active file system 31 and is striped across multiple physical storage devices according to a RAID protocol.

In the active file system, each file (and therefore each LUN) is stored in the form of a "buffer tree". A buffer tree is a hierarchical metadata structure (e.g., a linked list) used by the file system layer to keep track of the locations of the data blocks of a file. A buffer tree is the storage server's internal representation of the data blocks for a file. Each buffer tree has an inode at its root (top-level). An inode is a data structure used to store information, such as metadata, about the file, whereas the data blocks are structures used to store the actual data for the file. The information contained in an inode may include, for example, ownership of the file, access permission for the file, size of the file, file type, and references to locations on disk of the data blocks for the file. Alternatively, other types of configurations known by those of ordinary skill in the art may be used for the file system. It should be noted that a buffer tree is one type of hierarchical metadata structures used by the file system layer to keep track of the locations of the data blocks of a container. Alternatively, other types of hierarchical metadata structures that are known by those of ordinary skill in the art may be used.

Containerization

One embodiment of the invention includes packing small files together into larger files, and performing deletes of small files by recopying the larger combined file with the deleted sections omitted from the new file. Note, however, that this approach can reduce the effectiveness of space reclamation. Alternative embodiments, which are described below, provide better on-disk space efficiency for environments where the data objects stored are less than a block size, and are written once, perhaps read several times, and may eventually be deleted. The embodiments described below include packing multiple small data objects together into extents of one or more blocks of a container before writing to disk, and tracking their locations within those blocks. This is done by conceptually dividing each file system block (corresponding to a block in a storage file) into a number of smaller extents, which are filled individually in memory before writing a block at a time to disk.

In order to pack multiple small objects together into extents of one or more blocks of the logical container, several metadata maps may be created. For each data object inserted, the object map tracks which block of the container the data object is stored in, and which parts of that block it is stored in, and the actual amount of data in a given block for that data object. The object map may also track in which extents of the container the data object are stored. The object map also contains space for marking whether a data object has further pieces (i.e. whether the data object is spread across multiple blocks). If the data object has parts in other blocks, a pointer to the next part's location in the object map is kept, along with a flag indicating whether a given object space is the first part of the chain or not. Each object slot also contains a flag indicating whether or not that slot is currently allocated to an object. This mapping is a data-object-to-block mapping. Another mapping is the blocks to the used extents mapping. For each block in use, there is a bitmap of which extents in that block are allocated to some data object. In addition, the metadata may include memory-loading or initialization data, which may be implemented using counters to count how big the other maps are, and memory usage information. The metadata may also include a list of block identifiers (IDs) which are only partially full, sorted by the number of extents free in each block and/or a list of object IDs which have been deallocated.

These metadata files, together with the data file containing the actual objects themselves, are collectively referred to as the "container". The API for the library according to one embodiment can include operations for opening a container, reading a given object ID from the container, assembling objects piece-wise prior to insertion, inserting objects into the container, committing batched updates to disk, closing the container, and other operations.

Each stored data object is referred to by its "Object Identifier" in the container and is used to perform any operation on that data object. The "Object Identifier" is an opaque value and can have internal significance, e.g. encoding the location of the data it represents. When data objects are stored, they may be compacted while still in memory and are written to the store periodically. The library tracks the size of the block of the underlying file system, and effectively divides each block into a number of extents of a given size. The library fills each extent with data as if the extent or groups of extents constitute a smaller block than the block size of the internal block fragmentation. The library uses several metadata files in order to keep track of where parts of specific objects are kept within the particular container. The packed blocks themselves are stored in physical locations in the storage devices of the data storage system.

The library presents an API, which allows requests for services to be requested by other computer programs, and/or allows data to be exchanged between the library and computer program(s). In one embodiment, the library has similar semantics to the POSIX file I/O system calls that are implemented in conventional file systems. POSIX specifies the user and software interfaces to the operating system of the storage server. The library described herein may be supplementary or complimentary to the conventional POSIX I/O system calls. For example, the new semantics may be provided to a user and may be implemented in a new integrated file system that performs containerization as described herein. Alternatively, the system calls described herein may be implemented transparently from the application, in that the library performs the containerization operations without the application knowing of the new system calls.

The library itself may be implemented using both a selected block size and a selected extent size. The library may use the block size for I/O operations to/from the file system layer to the storage servers, and use the extent-size for storing the data objects. The block size may affect the I/O performance, and may be optimally equal to the block size of the underlying file system. The extent size affects the space efficiency of storing objects in the container, but the choice of extent size for optimal space efficiency may depend on the distribution of object sizes which that are to be stored in the container. For example, where the data packing is done on an extent basis, if the extent size of one or more objects happens to line up with the boundaries of the underlying block size, the performance of the file system increases since the I/O operations are done on a block size basis. However, if the extent size of the one or more data objects does not line up with the boundaries of the underlying blocks, the operations still operate, albeit with slower performance than when the boundaries of the extents line up with the boundaries of the blocks since additional blocks may have to be accessed to access the data object.

Containerization is performed by packing multiple data objects into a single container (e.g., file) that normally would be stored in separate containers in a conventional file system on a one-object-per-file basis. As described above, containerization may be implemented as an API to the containers, or alternatively, as a library that is between a conventional API and the file system layer. In the API embodiment, a custom set of commands for accessing the data objects, such as read and write, may be created. These custom set of commands can be implemented in the file system layer 21 of FIG. 2. Using this embodiment, the custom set of commands are provided to users so that they can access the data objects within the containers using these new file I/O system calls. The users may need to learn the new commands and may have to change the code of existing applications that access the data objects. These new commands may be similar to the POSIX file I/O system calls, except the new file I/O system calls include specific commands for not only accessing specific containers, but also accessing data objects within the specific containers in the file system.

For example, the following may represent I/O system calls for the new commands, copen( ), cwrite( ), cflush( ), cclose( ), cread( ), cdelete( ), ccompact( ), cstat( ), canalyze( ), cinitialize( ), cconvert( ), or the like. In one embodiment, the call copen( ) takes a path to a container's location, and returns a handle (e.g., identifier) to the underlying container. This may allow multiple containers to be opened by the same program simultaneously. The call cwrite( ) takes a handle to the container in which the allocation is to occur, a pointer to a buffer containing data to be put into the container, an integer indicating the size of the data in the buffer, an offset into the object being created indicating where the data in the buffer should begin inside the destination object, and a pointer to a structure representing a partial object mid-creation. It returns an integer error code. The call cflush( ) takes a handle to a container, and writes all changes to the underlying file system. It returns an integer error code. The call cclose( ) takes a handle to a container, does a commit( ), which causes any portion of the data object that has not yet been written to disk to be written to disk, and then deallocates any resources in the current process which correspond to that container. The handle provided as an argument is no longer valid after this call (for example, the call copen( ) allocates the memory for it, and the call cclose( ) frees the memory for it). The call cread( ) takes a handle to a container, the object ID within that container indicating the object to be recalled, a buffer to place the read data into, an integer indicating how much data to extract, and an offset indicating where in the object specified to begin extracting data. It returns the number of bytes copied out, similar to the POSIX read( ) function. The call cdelete( ) takes a handle to a container, and an object ID within that container to delete. It deallocates all extents in use by the specified object. The call ccompact( ) takes a handle to a container and compacts the data extents, object ID space and block map for that container to reduce the space used after a number of deletions. The call cstat( ) takes a handle to a container and returns usage information about it. The information contains the number of extents and blocks used and the total number of extents and blocks available. The call canalyze( ) takes a sample file size distribution and the underlying block size of a file system and calculates the optimal extent size and other configuration parameters for the effective use of containerization on that file system. The call cinitialize( ) takes a set of configuration parameters (for example, the output of canalyze( )) and prepares the on disk data structures and creates an empty container. The call cconvert( ) takes in a handle to a container and a target container version and/or a new set of configuration parameters and converts the existing container to the new layout. Alternatively, other file I/O system calls may be used that are similar to the POSIX file I/O system calls.

In one embodiment, the containerization process tries to reduce the disk input/output (I/O) overhead to the container by using cflush( ) to batch requests. A container can be loaded into memory in the storage server, modified significantly, and then written to the storage devices by issuing a final cflush( ). Batching the disk writes reduces disk I/O overhead significantly in many instances when more than one operation is done to a container having multiple objects. Providing an explicit call to write all changes to storage device allows the user to achieve the operate-commit semantic if desired.

Figure 4:
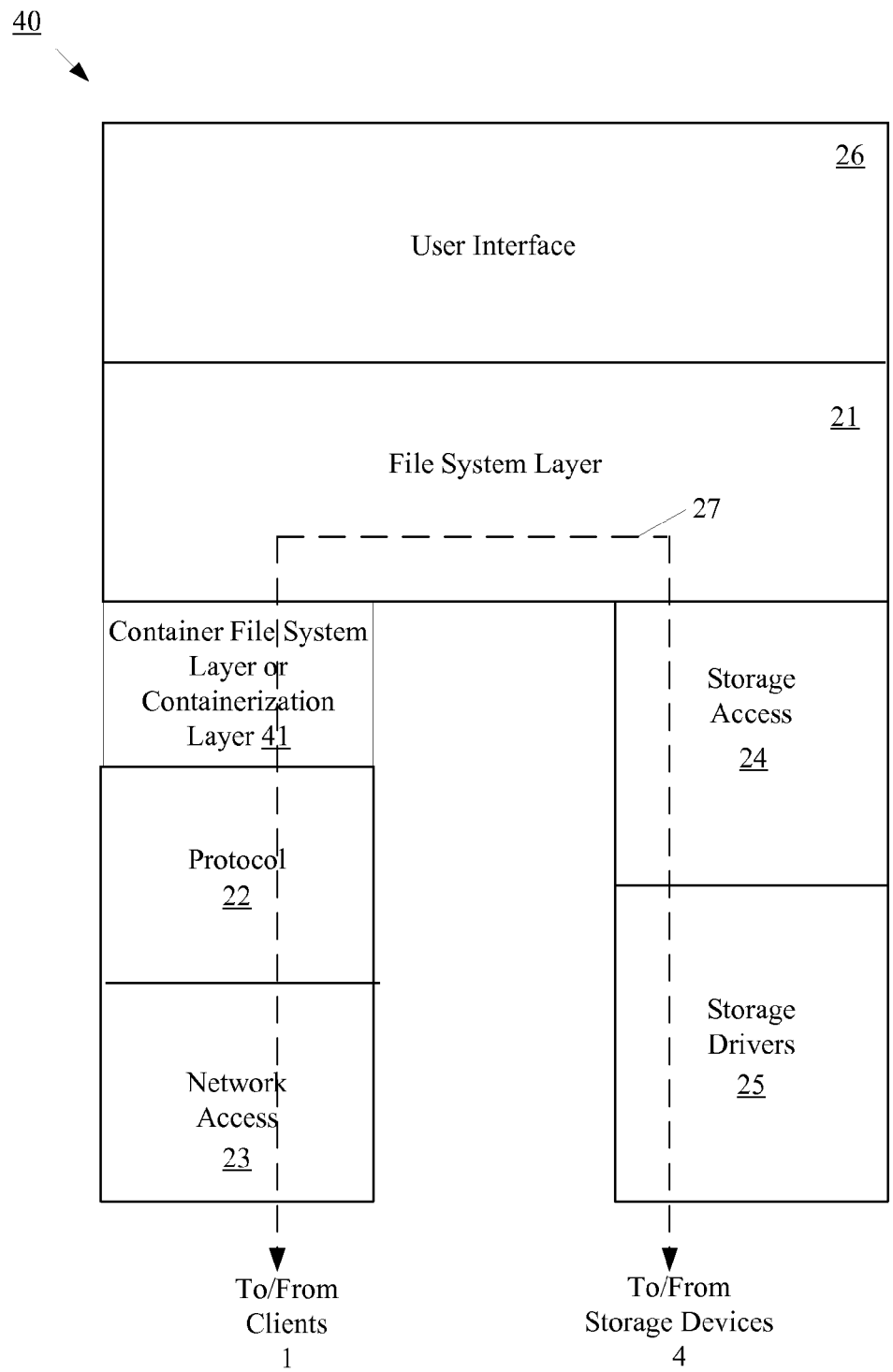
FIG. 4 illustrates another embodiment of the architecture of the operating system of the storage server 2.

FIG. 4 illustrates another embodiment of the architecture of the operating system of the storage server 2. Similar, to the operating system 20, the operating system 40 includes all the several software modules, or "layers" of the operating system 20. In addition, the operating system 40 includes a containerization layer 41. The containerization layer 41 includes a set of interfaces that are configured to allow access to data objects within a particular container. The containerization layer 41 is operatively coupled to the file system layer 21. The containerization layer 41 includes code to service read/write requests from clients 1, as well as other file I/O system calls, to a particular container or a data object within a container. A user (or application) can access a data object by referencing the container within which the data object is stored. A container map is accessed to determine the particular container within which the particular data object is stored. The container map includes entries that map the filename, as known to the outside world, to the particular container number (e.g., container ID). If the data object does not include a filename, an identifier can be returned to the user (or program) and retained so that the data object can be accessed in the future.

The containerization layer 41 may be configured to receive standard file I/O system calls (e.g., POSIX file I/O system calls), also referred to as file commands, and convert them into specific containerization calls, also referred to as containerization commands, to access the particular data object within a particular container.

When a particular container is accessed, the containerization layer 41 can access the particular data object within the container, such as by referencing the physical location of the data object. In order to access the physical location of the data object, an object map in the container can be accessed to determine the physical location of the object within the container, such as by determining the starting address of the data object and the length of the data object, using the object index value of the identifier. The physical location of the container and the object within the container may be encoded into the identifier of a particular object. The identifier can include various fields, for example, the version field, container ID field, and object index field. The version field includes a value that represents the version of the container. The container ID field includes the value that represents the physical location of the container. The object field index includes a value that represents that starting address within the container, and the length of the data object within the container.

In another embodiment, the set of interfaces of containerization as described herein may be packaged in a library. This library may be linked to any application. For example, this library may be provided to a user to be supplemental or complimentary to the library that includes the standard file I/O system calls. Similarly, the library is used to receive the standard file I/O system calls (e.g., file commands) and convert them into specific container I/O system calls (e.g., containerization commands) to access the particular data object within a particular container.

As described above, the library itself can be implemented in a block-size and extent-size agnostic way. However, there are performance benefits if the library employs a block size that matches the underlying file system block size. The extent size affects the space efficiency of storing objects in the container, but the choice of size for optimal space efficiency depends on the distribution of object sizes which will be stored in the container. In one embodiment, the extent size is less than the block size. In another embodiment, the extent size is in bytes as a power of two. In another embodiment, the extent size is a divisor of the internal block size of the file system.

Figure 5A:
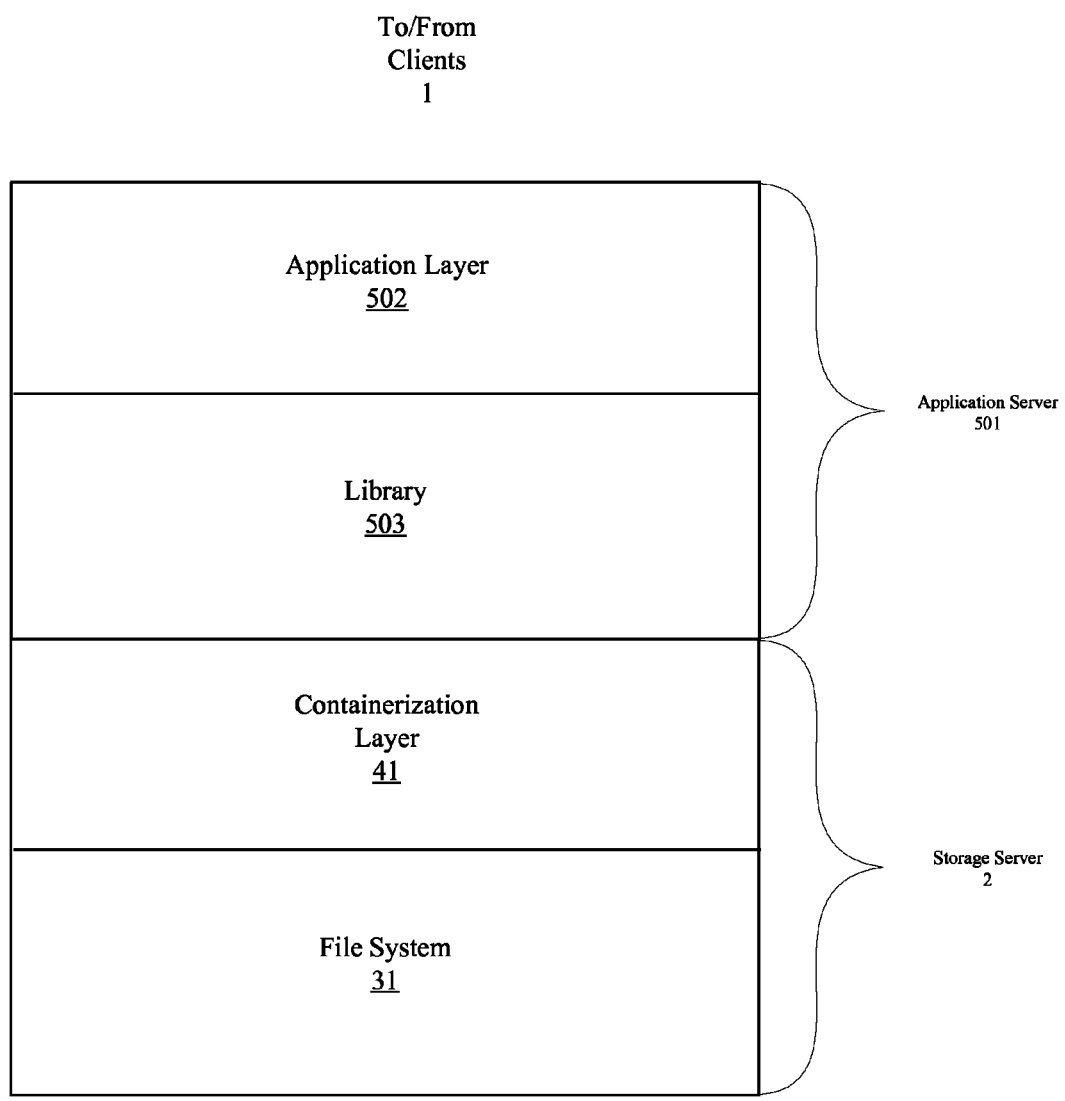
FIG. 5A illustrates one embodiment of a configuration of an application server and a storage server for accessing a data object within a particular container.

FIG. 5A illustrates one embodiment of a configuration of an application server and a storage server for accessing a data object within a particular container. Application server 501 includes an application layer 502 and a library 503. The application layer 501 is a program that is configured to access particular data objects that are stored on the storage devices 4 through the storage server 2. The library 503 is linked to the application layer 501 and includes a set of interfaces for accessing the particular data object within the particular container, as described herein. The library 503 is configured to receive file I/O system calls (e.g., POSIX file I/O system calls, also referred to as system commands) from the application layer 501. The library 503 converts the system calls into containerization commands. The containerization commands may be similar to the system commands, but are configured to service read requests, write requests, or the like, that access data objects within a particular container, instead of read, or write requests that only access the particular container.

In one embodiment, an application layer 502 is configured to store data objects in separate files or other types of containers. However, the library 503 and containerization layer 41 are configured to transparently manage multiple data objects that are stored within the containers, instead of each data object being stored in a separate container. When an application desires to store a data object, it may use standard file I/O system calls, such as POSIX file I/O system calls, to create, write, and close the container within which the data object is to be stored. The POSIX file I/O system calls are typically included in a library that is distributed with the operating system. When the application is created it references this standard library to use these standard system calls. In order to implement new container commands, a separate library 503 (or alternatively, an updated modified standard library) may be provided to the user and the user modifies the application to reference this new library 503 of containerization commands. The library 503 converts the standard system calls to the custom containerization calls. This way the code of the application layer 502 does not have to be modified to reflect the new containerization commands, but merely has to link this new library 503 to their application layer 502.

The containerization layer 41 is configured to determine which particular container is being accessed as well as which particular data object within the container is being accessed. The containerization layer 41 may determine the particular container and data object by decoding the identifier of the data object. The data object may be created by the library and returned to the application so that the data object can be accessed in the future. Alternatively, the application already knows the identifier of the data object. The containerization layer 41 may receive the object identifier from a container map of the library 503. The container map of the library 503 includes the mappings between filename of the data object, as known by the outside world (e.g., the user or application), and the identifier of the data object. The application may not know the identifier of the object, and the mappings between the object index and its physical location within the particular container (e.g., offset and length of the data object). The containerization layer 51 manages the mappings between the filename of the data object and the physical location within a particular container using an object map, and the library 503 manages the mappings between the filename and the logical containers. Alternatively, the containerization layer 51, or a file system layer that implements the containerization operations, may be configured to manage both the mappings between the filename of the data object and the physical location with a particular container, and between the filename and the logical containers.

In one embodiment, the new library 503 is placed in a list of libraries to be searched by the application (e.g., dynamic libraries) or linker (e.g., static libraries) when searching for a particular function call. The new library 503 may be placed in the list before the standard system calls library, and since it is earlier in the list when the application or linker searches for a particular call, it finds the call in the new library 503, and may cease to search the other libraries. In this way, the new library 503 may be supplementary to the standard system call library. Alternatively, the standard library may be modified to include the new containerization commands.

As described above, the file system 31 is created and managed by the file system layer 21 and containerization layer 41 of the operating system. The file system 31 represents the data set as stored in the storage devices for access and retrieval of data within the data set. For example, the data set may be a volume having multiple containers. However, unlike the conventional file systems that store data objects on a one-object-per-container basis, multiple data objects are stored within a single container.

Figure 5B:
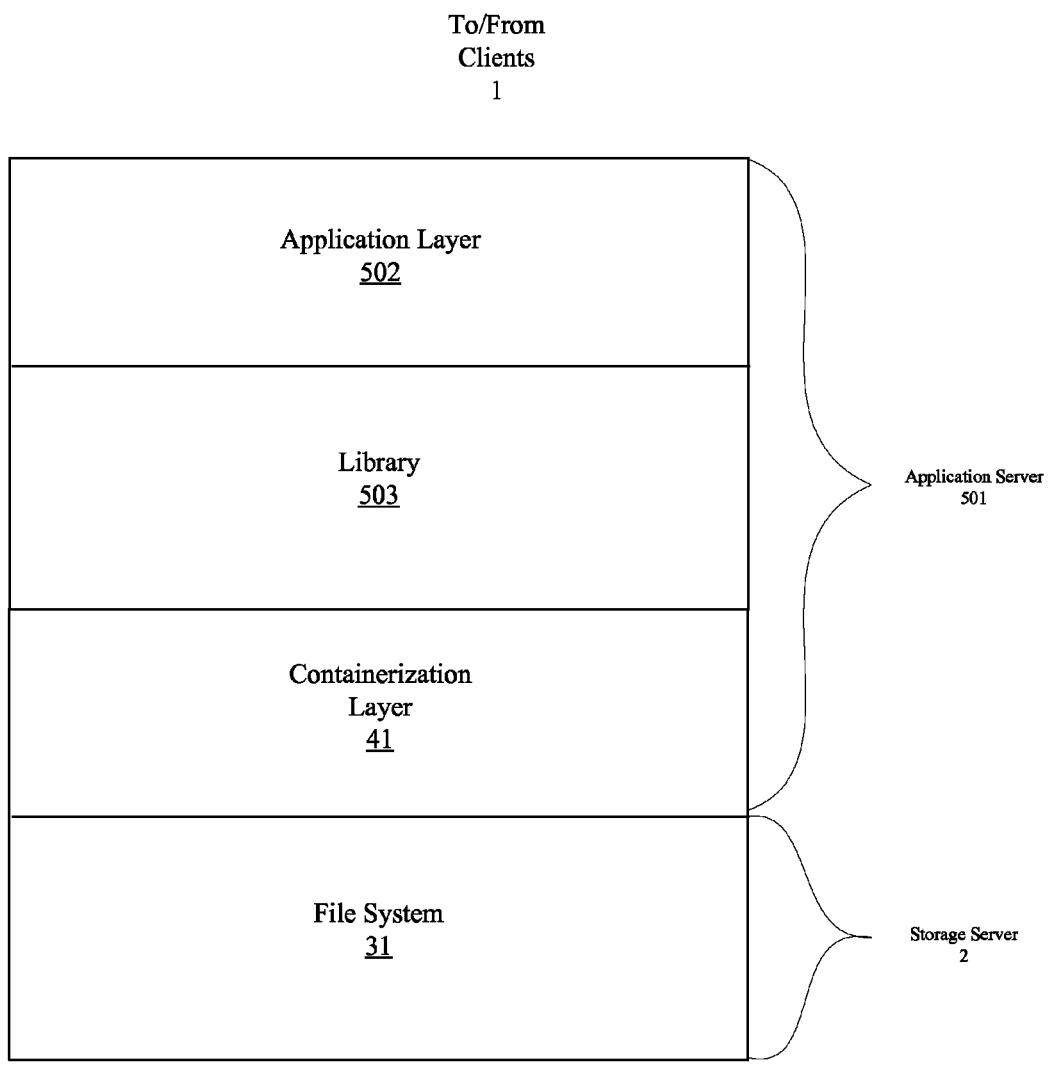
FIG. 5B illustrates another embodiment of a configuration of an application server and a storage server for accessing a data object within a particular container.

FIG. 5B illustrates another embodiment of a configuration of an application server and a storage server for accessing a data object within a particular container. This configuration is similar to the configuration of FIG. 5A, except the application server 501 includes the application layer 501, the library 502, and the containerization layer 41, and the storage server 2 includes the file system layer 21. In this configuration, the flow and control of operations are similar to the flow and control of the configuration of FIG. 5A, but merely where the layers reside differ.

In one embodiment, the library 503 is configured to repack the data within the file system, reclaiming space and freeing up space. The library 503 may be configured to track the size of the block of the underlying file system, and effectively divides each block into a number of extents of a given size. It fills each extent with data as if the extent or groups of extents constitute a smaller block than the block size of the internal block fragmentation. The extents may be multiple sizes of the block size. For example, if data objects of 300 bytes are expected, the extent sizes may be set to be slightly larger than the size of the expected data objects, for example, 512 bytes, or to the extent size could be set to a reasonable fraction of the data object size, for example, 128 bytes. Alternatively, other extent sizes may be used.

Also, as described above, the library uses several metadata files in order to keep track of where parts of specific objects are kept within the particular container. The packed blocks themselves are stored in physical locations in the storage devices of the data storage system.

In effect, each container is configured to operate as a micro-file system. That is each container is configured to store multiple data objects within the container, much like a file system layer manages files within a volume in a conventional file system.

It should be noted that when a data object is spread across a number of blocks (e.g., the data object is larger in size than the block size), accessing the data object may decrease in speed. In this case, an external file may be used to store multi-block objects. When an object stored is greater than a block size, the portion of the file, up to an integer multiple of the block size, can be pushed out into an external file with a name based on the object ID. When running on top of a file system with a maximum ratio of inodes to storage space (e.g., one inode per 32K storage space) this could be switched to using multiples of the storage space or inode size rather than the block size. The remainder, under a block or space/inode, can be stored normally as the next link(s) in a chain of object slots, with its tail in the current container. The external chunk corresponding to the main object can be flagged as external, and the "data in block" field can be used instead as a count of the number of whole blocks or chunks in the external file. This approach may increase the speed of access (e.g., read operations) on the underlying file system, may use less space in the object map for large files, and still may not waste as much space for the last remainder of data that has been moved to an external normal file.

In addition, the defragmentation may be limited by the object IDs returned to the client, as those object IDs cannot be relocated in the object map. This may be addressed, in one embodiment, by maintaining a mapping between the externally known Object IDs and the Container resident Object IDs. This would allow the Container resident Object IDs to be relocated and the map modified to reference the new location. This may be done by adding a simple redirect (i.e. a hashtable) to redirect, along with a callback in the object ID space defragmenting code to allow updates to the structure when object IDs are defragmented, which may both reduce the size of the object ID map on disk because it will not have to remain sparse after defragmentation, and shrink the size of the free object ID list file, as that file only contains the OIDs in the sparse regions of the object map, under the incremented cap ID.

In another embodiment, support for combining two or more containers may be done by creating a larger, valid container that includes the contents of the first and second containers. This can be done by accessing the second container's object ID map and incrementing all block IDs fields by the maximum allocated block and object IDs of the objects in the first container, and appending the block map, modified object ID map of the modified second container's ID map to the end of the unmodified first container's object ID map. This may include the OID remapping (described above) with update callbacks described above, to avoid invalidating object IDs from the second container which were returned externally. This larger container can then be defragmented as normal to completely combine the two containers.

Referencing Data Objects

Described below are embodiments for referencing data objects within a container that include multiple data objects and for merging multiple data objects of different containers into a single container. As described above, a container may need to be merged for various reasons. For example, the container has very few data objects due to which the per-object overhead of maintaining the container might be high. Also, the system that stores the container could be getting decommissioned or the number of containers is very large and thus makes the task of data protection very cumbersome. Alternatively, other reasons may warrant merging two or more containers. An object based storage system may be configured to hide the underlying storage semantics from the user. Data objects may be stored using a simple transaction based interface and retrieved or deleted by using the object's unique handle. The container that stores the data objects treats the data as opaque and only tries to meet the system properties of the stored objects (reliability, integrity, security, etc). Each object can have associated with it a number of user defined attributes. These embodiments may include a flat namespace (e.g., no path names or directories), transaction semantics, such as a commit( ) command to write the objects to the container in their physical location on the storage devices. These embodiments may ease the process of backing up and replicating data. The data objects may be immutable, such as storing revisions as a new object. These embodiments may be implemented as a simple interface to store, retrieve, delete data objects, or the like, and may leverage existing protocols, such as NFS.

The embodiments described herein may be used to consolidate multiple, sparsely-filled containers which can be distributed in a large system. The embodiments described herein may be used to reduce the amount of unused space in maintaining the container, reduce the overhead in backing up the sparsely-filled containers, allows multiple containers to migrate from one physical location to another, and allows for upgrading or downgrading containers to different versions. The embodiments described herein may use a method to virtualize both the location of a container and the locations of the multiple data objects within the container. Conventionally, virtualization has only been done for location of containers, and not objects within containers. This virtualization provides a mechanism for enabling independent referencing of container and objects. The embodiments described herein also allow two or more containers to be merged. The embodiments described herein enable separately referencing data objects within a container.

Figure 6:
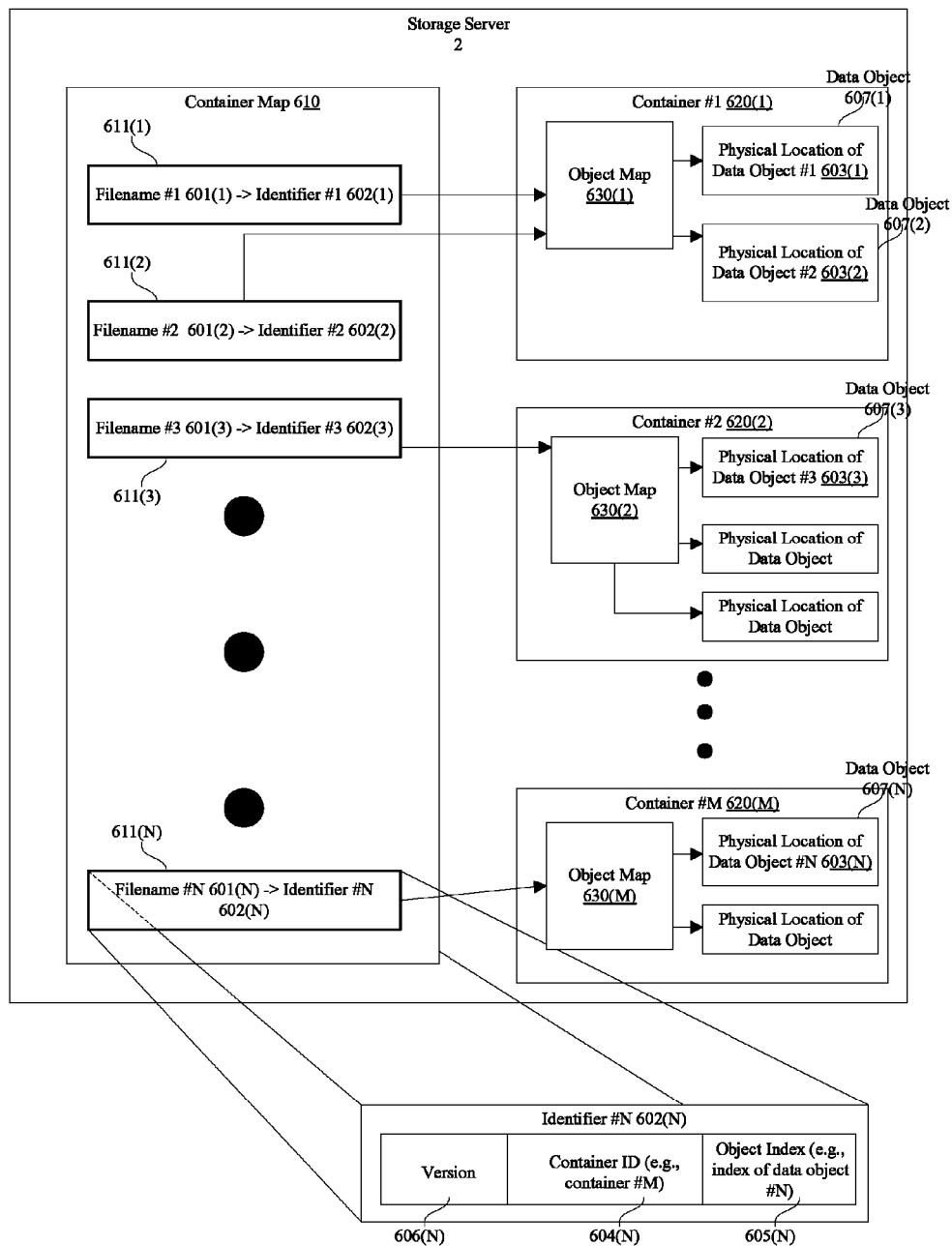
FIG. 6 illustrates one embodiment of a container map and multiple containers including object maps to the physical locations of the data objects within each container.

FIG. 6 illustrates one embodiment of a container map and multiple containers including object maps to the physical locations of the data objects within each container. The container map 610, which may be implemented in the library 503, includes multiple mapping entries 611(1)-(N). The entries 611(1)-(N) map the filenames 601(1)-(N), as known to the outside world (e.g., user or application), to the identifiers 602(1)-(N) of the data object. The identifier includes at least the container identification (container ID), which indicates within which particular container the object is stored, and the object index, which may include the offset within the particular container and the length of the object within the container. For example, identifier #N 602(N) includes the container ID 604(N), the object index 605(N). In another embodiment, the identifier 602(N) may include a version field 606(N), which indicates the particular version of the container and/or data object stored within the container. The version fields 606(1)-(N) may be used to upgrade or downgrade the containers. In another embodiment, the container map 610 may assign an identifier that corresponds to a new data object within a container (either a new container or an already existing container), and returns this value to the user or application to be kept for later retrieval of the created data object.

For example, when an application or user desires to access a data object within the file system, having a filename #1 601(1), the container map 610 is accessed to determine in which container the data object is stored. In this example, the filename #1 601(1) is stored in container #1 620(1), as determined by the container ID 604(1) of the identifier #1 602(1). Subsequently, the container #1 620(1) is accessed to determine where within the container 620(1) the data object (filename #1) is stored. This may be done by accessing an object map 630(1). The object maps 630(1)-(M) are stored in the containers 620(1)-(M), respectively. The object maps include a listing of all the data objects within the particular containers. Using the object map 630(1) and the object index 605(1) of the identifier 602(1), the data object 607(1) can be found in the container 620(1). The data object 607(1) includes the physical location of the data object #1 603(1) on the storage devices 4. For example, if the containerization layer 41 receives a call to read the data object, having a filename #1 601(1), the containerization layer 41 returns the contents of the data object 607(1), which are stored at the physical location 603(1). Similarly, access to the data object 607(1) may be performed for other containerization commands.

In one embodiment, a particular container is accessed for multiple commands before the modified data is written back to the physical location on the storage servers. For example, multiple write commands may be cached until there is a sufficient amount of writes to justify the container access. The writes commands may be to different data objects within the same container. Upon completion of the cached write commands, the modified data of the container may be written to the physical location of the container on the storage devices. This may be used for performance optimization. Alternatively, each write command may accesses the container, modify the contents, and write to the container to the physical location on the storage server before another write command for that container is received. This may have a negative performance impact since each write command may include writing the data to the container and updating the index. In particular, when the data object to be written is small in comparison to the entire container, accessing the container to write a single data object and update the index reduces the performance efficiency. As described above, this performance efficiency may be increased by caching operations to the container and performing these operations together.

Figure 7A:
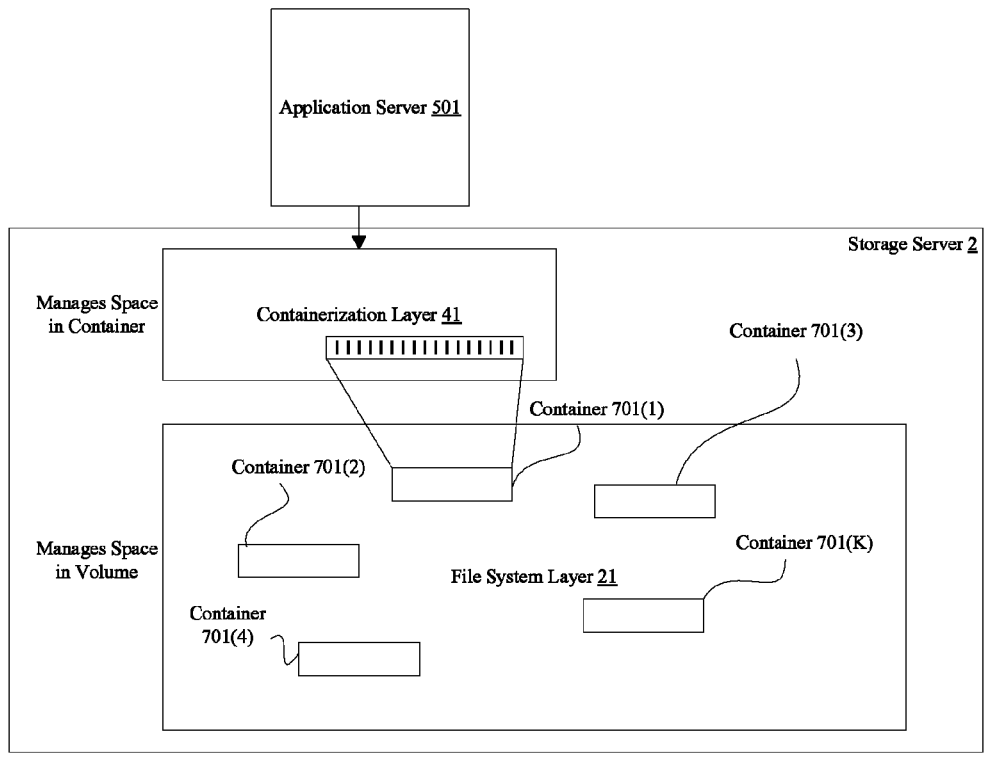
FIG. 7A illustrates an embodiment of multiple containers in a file system.

FIG. 7A illustrates an embodiment of multiple containers in a file system. An application on the application server 501 accesses data stored on storage devices 4 through the storage server 2. The storage server 2 includes the operating system that includes the containerization layer 41 and the file system layer 21, which are configured to manage the data that is stored in the file system 31. As described above, multiple data objects are stored in a single container, and the file system may include multiple containers, such as container 701(1)-(K). In particular, the file system layer 21 manages the space occupied by the containers 701(1)-(K) within one or more volumes (typically one volume), and the containerization layer 41 manages the space within a particular container. The containerization layer 41 manages multiple data objects within the container by tracking the contents and the physical locations of the data objects that are stored within the container. In effect, each container may store multiple data objects, which reduces the unused space caused by the internal block fragmentation of the file system, as well as reduces space needed to store metadata corresponding to the data objects and containers that store these objects. The container map in the library that is linked to the application contains the mappings between the filenames of the data objects and the container identifier of the container in which the data object is stored. The containerization layer may be configured to not only determine which container within which the data object is stored, but also where within the container is the data object stored, such as the offset or starting address within the container of the data object, and the length of the data object. As illustrated in the first container 701(1), each container may be divided into a plurality of extents, as described in more detail with respect to FIG. 7. In one embodiment, the internal blocks of the containers have a block size of 4 kilobytes (Kbytes), and the extents each have an extent size of 128 bytes, 256 bytes, or 512 bytes. For example, if the extents are 512 bytes there are eight extents for each block. Alternatively, the extent sizes and block sizes may be other values that are powers of two as well as other values, but the extent sizes need be smaller than the block size.

In one embodiment, the data objects to be stored are 300 bytes or less, the file system block size is 4 Kbytes and the container extent size is 512 bytes. In this embodiment, eight data objects can be stored in a single block of 4 Kbytes (4096 bytes), and there is approximately 1696 bytes unused of the 4 Kbyte block, as compared to 30368 bytes (8 separate files of one block each of 4 Kbytes) in a conventional one-data-object-per-one-file model. Furthermore, additional space may be needed to store the metadata to track the eight different data objects in the eight different containers (e.g., files). The embodiments described herein allow both large and small data objects to be stored in the container, allowing unused space caused by data objects that are smaller than the block size to be reduced. It should also be noted that data objects that are larger than 4 Kbytes can still be stored in multiple blocks of the container. For example, when the data objects are larger than a block size, such as when the data objects are 7 Kbytes and the block size is 4 Kbytes, conventionally two blocks would be used, and 1 Kbyte of space would be wasted per file. However, if containerization, having an extent size of 1 Kbytes, is used then the data objects would each be stored in 7 extents, and there would be zero wasted space, as described herein. When storing objects that are larger than a block size, storage space can be saved if the number of extents used to store an object larger than the block size is not a multiple of the number of extents per block. The unused space (e.g., remaining unused extents of the last block) caused by the data object that is larger than one block size may be filled with additional data from another data object.

The application layer 502 of the application server 501 accesses a data object by accessing the container within which the data object is stored, and then the location within the container where the data object is stored is accessed by the containerization layer 41. For example, the application layer 502 accesses a data object that is within the first container 701(1) using the mappings of the library that is linked to the application. The containerization layer 41 then uses the mappings in the container itself to determine the physical location within the particular container in which the data object is stored.

Figure 7B:
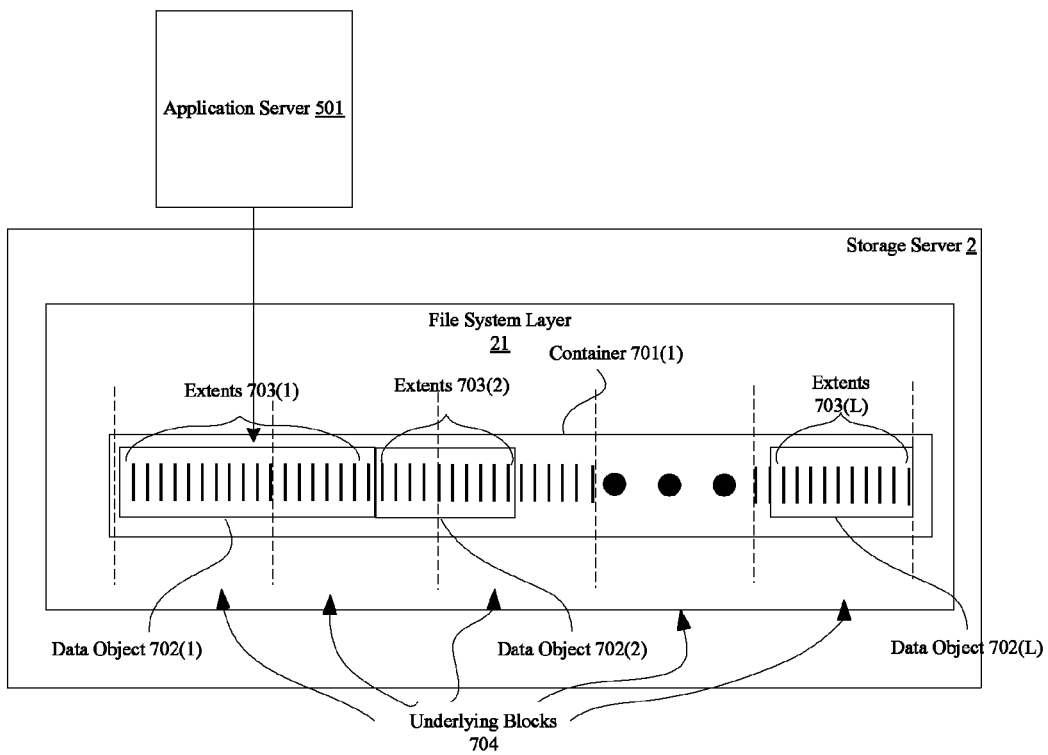
FIG. 7B illustrates another embodiment of data objects stored in multiple extents of a container.

FIG. 7B illustrates another embodiment of data objects stored in multiple extents of a container. In this embodiment, the containerization layer is also found on the application server 501 with the library 503 and application layer 502 (such as illustrated in FIG. 5B. The application layer 502 of the application server 501 also accesses a data object by accessing the container within which the data object is stored, and then the location within the container where the data object is stored is accessed by the file system layer 21. The file system layer 21 receives the containerization commands from the application server 501 to determine the physical location of the data object within the container. For example, the application layer 502 accesses a data object that is within the first container 701(1) using the mappings of the library that is linked to the application. The file system layer 21 then uses the mappings in the container (e.g., object map) itself to determine the physical location within the particular container in which the data object is stored.

In this embodiment, the container 701(1) includes multiple data objects 702(1)-(L). Each data object is stored in a set of extents 703(1)-(L). The size of the set of extents may differ for each data object. Also, it should be noted the extents are illustrated as multiple vertical bars within the data object. The number of vertical bars, however, is not indicative of the actual number of extents that are used on the particular data object. Decoding the identifier that corresponds to the particular data object, the file system layer 21 can determine the location (e.g., starting address or offset) of the data object within the container 701(1), as well as the size of the data object. For example, the data object 702(1) may have an offset of zero and a size of 6 Kbytes, and the data object 702(2) may have an offset of 6 Kbytes and a size of 4 Kbytes. Alternatively, the data objects 702(1)-(L) may have other values for their offsets and sizes.

FIG. 7B also illustrates the underlying blocks 704 of the container, and how multiple data objects can be packed into multiple extents of a single container. As described above, the blocks have a fixed size according to the internal block size dictated by the internal block fragmentation of the file system, and each block is divided into multiple extents. The extent size may be evenly divisible into the block size (e.g., a multiple of the block size). In effect the containerization code of the containerization layer allows the internal block size of the file system to be ignored for purposes of data packing multiple data objects in multiple extents within a single container. This reduces the unused space caused by the internal block size, as well as the space needed to store metadata to track the container. This may increase the efficiency of storing lots of relatively small data objects in a file system. It should be noted that typically, the amount of metadata used to describe an object location within the container is much less than the amount of metadata used to describe a file within a file system.

It should be noted that using containerization, additional metadata may be created to track the data objects within the container, however, the increase of storage space for this metadata will typically be orders of magnitudes less than the amount of space saved by reducing the unused space. In one embodiment, the metadata for a container is assumed to be the same for each of the data objects within the container. This reduces the amount of metadata used to track the location of each object in the container. For example, this metadata to track the location of each data object may include a value that represents the offset or start of the data object within the container, and a value that represents the size of the data object. As previously mentioned, metadata for each file or container may be 192 bytes of data. The metadata to track the data objects within the container may be 6 bytes (e.g., 3 bytes to represent the offset of the data object and 3 bytes to represent the size or length of the data object). Since the metadata for the container is the same for each of the data objects, the metadata to track the objects do not need to include such metadata that corresponds to the container, such as container ownership, access permission to the container, or the like. In another embodiment, the metadata for each data object may differ from the metadata that corresponds to the container. Alternatively, other values may be used to represent these values and other types of metadata may be used to track the data objects within the particular container, for example, ownership of the data object, access permission for the data object, object type, data object size, and pointers used to locate the data objects in the container. These other types of metadata may increase the amount of space required for the metadata for each object.

As described above, an object identifier (OID), such as identifiers 602(1)-(N), is configured to encode the location of the stored object to which it points. The OID can be broken up into the following components: version field, container ID, object index. The version field may be used to understand the internal layout of the OID and may be used to track future changes to the object. The "container ID" field may include the unique identifier for the container within which the data object is stored. The object index field may include the unique index of the start of the data object within a container.

The embodiments described herein may be used to virtualize nodes in the OID namespace. The first virtualization is at the "container ID" level. This allows the logical container ID to point to any physical location on the storage devices, thus enabling the physical migration of containers, and independent referencing of containers. This also allows for multiple virtual containers to map to a single physical container. This property may be used in merging data objects from multiple containers. This virtualization is maintained as system wide table that stores the table of mappings from a virtual container to a physical container. The system wide table may be a container map, as described above in the library 503, which is linked to the application.

The second virtualization is at the "object index" level. This allows for an object to be located within a container. This virtualization is maintained as a table, such as object maps 630(1)-(M), which is private to the container that stores the mapping of virtual object indices to its physical locations within the containers. Keeping this table private to the individual container may allow the system wide virtual container table to be small and easy to distribute. The private container is loaded and accessed by clients interested in accessing a particular container to locate a particular data object within that container. Alternatively, the table of the object mappings is not made private to the individual container.

A lookup on an OID may first map the virtual container ID to its physical location and then map the virtual object index of the start of the object within the target container.

In one embodiment, an additional mapping is maintained in each physical container. This may be done in case a container virtual object index clashes or if the data from the container map or the object map become corrupt or otherwise unavailable. The additional mapping may contain the mapping of the OID to the new virtual index.

As described above, the version field may be used to upgrade or downgrade containers or data objects to different versions.

Merging Containers

Described below are various embodiments for merging the data of two or more containers that have unused space into one of the two containers, or alternatively, to a separate additional container. The operation of merging containers may be used to consolidate multiple, sparsely-filled containers, to consolidate multiple small containers, or the like. This may reduce the amount of unused space in maintaining the container, and may reduce the overhead in backing up the sparsely-filled containers. These embodiments may also be used to migrate multiple containers from one physical location to another in the storage devices.

In one embodiment, the container A includes a virtual identifier Va and a physical location Pa, such that virtual identifier Va points to the physical location Pa. Container B includes a virtual identifier Vb and a physical location Pb, such that the virtual identifier Vb points to the physical location Pb. Merging containers A and B may include the following operations. First, a dual entry is made to the system wide container map, setting the virtual identifier Va to point to physical location Pa and the physical location Pb (Va→Pa, Pb). This is done so that all requests to the virtual identifier Va is mirrored to the physical locations Pa and Pb. This may also be used as a mechanism for mirroring containers to more than one location. This may allow for a deterministic completion of the migration process. A single iteration of the data objects in physical location Pa is made in order to migrate the data objects to the physical location Pb. The data object is first read from the physical location Pa and then writes the data object to the physical location Pb. In one embodiment, the original virtual object index of the virtual identifier Va is maintained when it is written to the physical location Pb, if possible. If the virtual index is not available, a new mapping is created to point to the physical location Pb. The new mapping maps the virtual identifier to the new physical location Pb of the data object within the container. As each data object is transferred, its virtual mapping in the physical location Pa is marked migrated. Once all the data objects have been transferred, the system wide container map is updated to reflect that the virtual identifier Va points to the physical location Pb. The container in the physical location Pa can now be deleted and its space reclaimed.

A similar approach can be used to upgrade or downgrade an existing container while keeping it available for access. The upgrade can be done by creating a new empty physical container and then migrating the data objects to the new physical container. In this case, an additional container map is not needed as all the old virtual identifiers are available for migration and new virtual identifiers may be created in empty slots.

Figure 8:
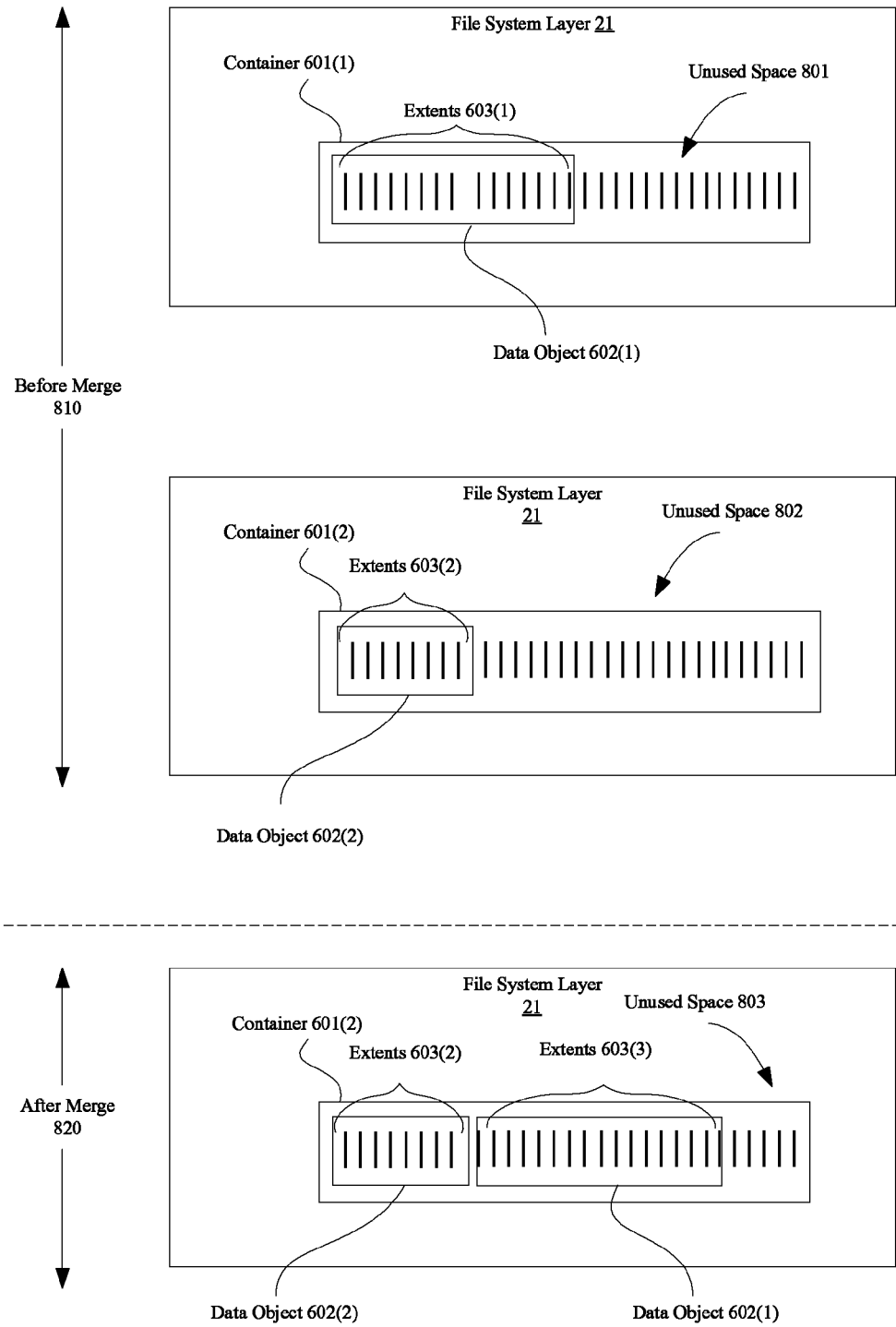
FIG. 8 illustrates one embodiment of merging the data objects of two containers into one of the containers.

FIG. 8 illustrates one embodiment of merging the data objects of two containers into one of the containers. In this embodiment, there are two containers, container 601(1) and 601(2), which each include a data object 602(1) and 602(2), respectively. These containers 601(1) and 601(2) are illustrated in FIG. 8 before the merge 810, and the container 602(2) is illustrated in FIG. 8 after the merge 820. Alternatively, additional data objects of one or more containers may be merged into the container or into multiple containers. The data object 602(1) is stored in a set of extents 603(1) within the container 601(1). The data object 602(2) is stored in a set of extents 603(1) within the container 601(2). Container 602(1) also includes unused space 801 because the data object 601(1) only fills a portion of the space of the container 601(1). Container 602(2) also includes unused space 802 because the data object 601(2) only fills a portion of the space of the container 601(1) before the merge 810.

In order to merge the data objects 602(1) and 602(2) into the container 601(2), the data object 602(1) is read from the physical location of container 601(1). The data object 602(2) is already in the first extents of the container 601(2), and thus, remains in the physical location within the container 601(2). However, if the data object 602(2) was located in another physical location within the container 601(2), the data object 602(2) may be moved to the physical location within the container 601(2) as illustrated in FIG. 8 before the merge 810, or alternatively, before the data object 602(1) is read from the container 601(1) and written to the container 601(2). For example, the unused space 802 may be located before and/or after the data object 602(2) in the container 601(2), although the unused space 802 is illustrated as being located only after the data object 602(2). After the data object 602(1) is read from the physical location of container 601(1), the data object 602(1) is written to a physical location within the container 601(2). Since the data object 602(2) is already in the set of extents 603(2), the data object 602(1) is written into subsequent extents 603(3) of the container 601(2). In this particular embodiment, there is unused space 803 where the data object does not fill the last block of the data container. This unused space 803 may be minimal, and where the block size is 4 Kbytes, the unused space 803 is less than 4 Kbytes. After the data objects 602(1) is written to the container 601(2), the virtual mappings of the physical location of the data object 602(1) of the container 601(1) is marked as migrated, and the mappings in the container map are updated to reflect that the virtual identifier of the data object 601(1) points to the physical location within container 601(2) (e.g., set of extents 603(3)). Also, the entire container 601(1) may be deleted and its space reclaimed.

Figure 9:
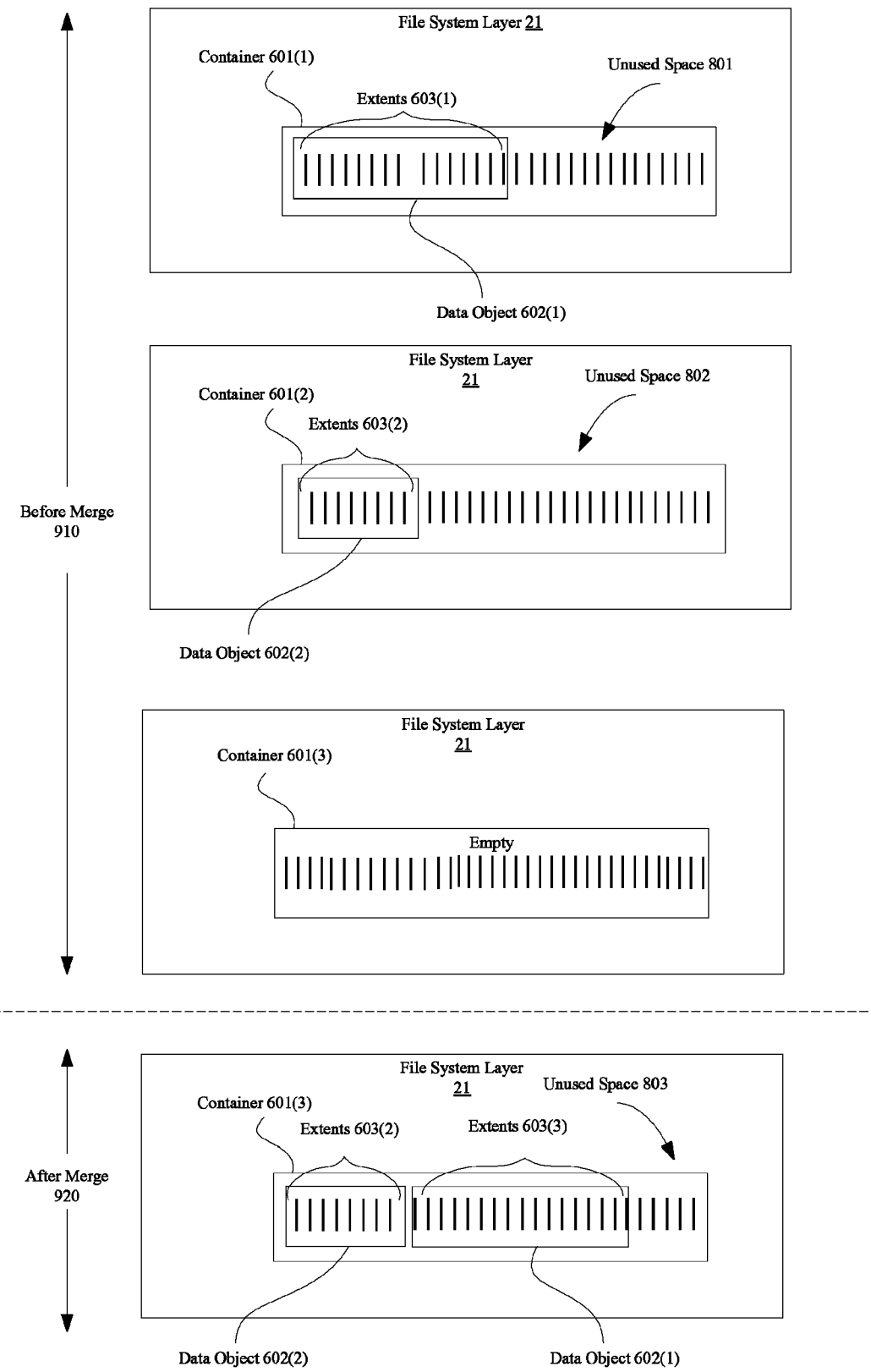
FIG. 9 illustrates one embodiment of merging the data objects of two containers into a new container.

FIG. 9 illustrates one embodiment of merging the data objects of two containers into a new container. In this embodiment, there are the same two containers 601(1) and 601(2), which each include the same data objects 602(1) and 602(2), respectively. However, instead of merging the data object 602(1) of container 601(1) and the data objects 602(1) of container 601(2) into the same container 601(2), the data objects 602(1) and 602(2) are merged into a new container, container 601(3). These containers 601(1)-601(3) are illustrated in FIG. 9 before the merge 910, and the container 602(3) is illustrated in FIG. 9 after the merge 920. Alternatively, additional data objects of one or more containers may be merged into the container or into multiple containers. The data object 602(1) is stored in a set of extents 603(1) within the container 601(1). The data object 602(2) is stored in a set of extents 603(1) within the container 601(2). Container 602(1) also includes unused space 801 because the data object 601(1) only fills a portion of the space of the container 601(1). Container 602(2) also includes unused space 802 because the data object 601(2) only fills a portion of the space of the container 601(1) before the merge 810. Container 601(3) includes no data objects and may be a newly created container 601(3).

In order to merge the data objects 602(1) and 602(2) into the container 601(3), the data object 602(2) is read from the physical location of container 601(2) (e.g., set of extents 603(2)). Since the container 601(3) is empty, no data objects need to be moved within the container 601(3) before the data objects from the containers 601(1) and 601(2) are merged. Also, since no data objects are present in the container 601(3), the data object 602(2) is written into the set of extents 603(2) of the container 601(3). This may be done so that the object index of the data object 602(2) does not need to be updated. Similarly, the data object 601(1) may be written in the container 601(3) first and may maintain the mapping in the new container. After the data object 602(2) has been written to the set of extents 603(2) of the container 601(3), the virtual mappings of the physical location of the data object 602(2) of the container 601(2) is marked as migrated, and the mappings in the container map are updated to reflect that the virtual identifier of the data object 601(2) points to the physical location within container 601(3) (e.g., set of extents 603(3)). Also, the entire container 601(2) may be deleted and its space reclaimed.

Subsequently or concurrently, the data object 601(1) may be read from the physical location of the container 601(1) (e.g., set of extents 603(1)), and written to the subsequent set of extents 603(3) of the container 601(3). After the data object 602(1) has been written to the set of extents 603(3) of the container 601(3), the virtual mappings of the physical location of the data object 602(1) of the container 601(1) is marked as migrated, and the mappings in the container map are updated to reflect that the virtual identifier of the data object 601(1) points to the physical location within container 601(3) (e.g., set of extents 603(3)). Also, the entire container 601(1) may be deleted and its space reclaimed.

In this particular embodiment, there is unused space 803 where the data object does not fill the last block of the data container. This unused space 803 may be minimal, and where the block size is 4 Kbytes, the unused space 803 is less than 4 Kbytes. In this embodiment, the unused space 803 is less than the sum of the unused space 801 and unused space 802.

The embodiments described herein may be implemented to reduce the amount of unused space of the underlying file system due to the internal block fragmentation. The embodiments described herein may allow creation of an arbitrary number of data objects regardless of any limitations of the underlying file system. The embodiments described herein may be implemented in any local or remote general purpose file system. The embodiments described herein may provide a simple object-based interface to the user and rids them of remembering and creating file system hierarchies. Also, as described herein the object handle (e.g., Object identifier) lookup is generally faster than a pathname and directory lookup, as done conventionally. The embodiments described herein may also take an object size distribution and parameterize the underlying containerization to provide the best space efficiency in the file system.

The embodiments described herein may be used for independent referencing of containers and objects within containers, which allows easy migration of data between containers, and allows for moving physical locations of data within extents of the containers. This may allow growing of free regions and/or resizing or punching holes to reclaim space in the file system. The embodiments described herein may allow the above described operations to be preformed transparently on a system, while keeping all the container data online for use. The embodiments described herein may also be used to provide seamless and non-disruptive maintenance of their container data.

Figure 10:
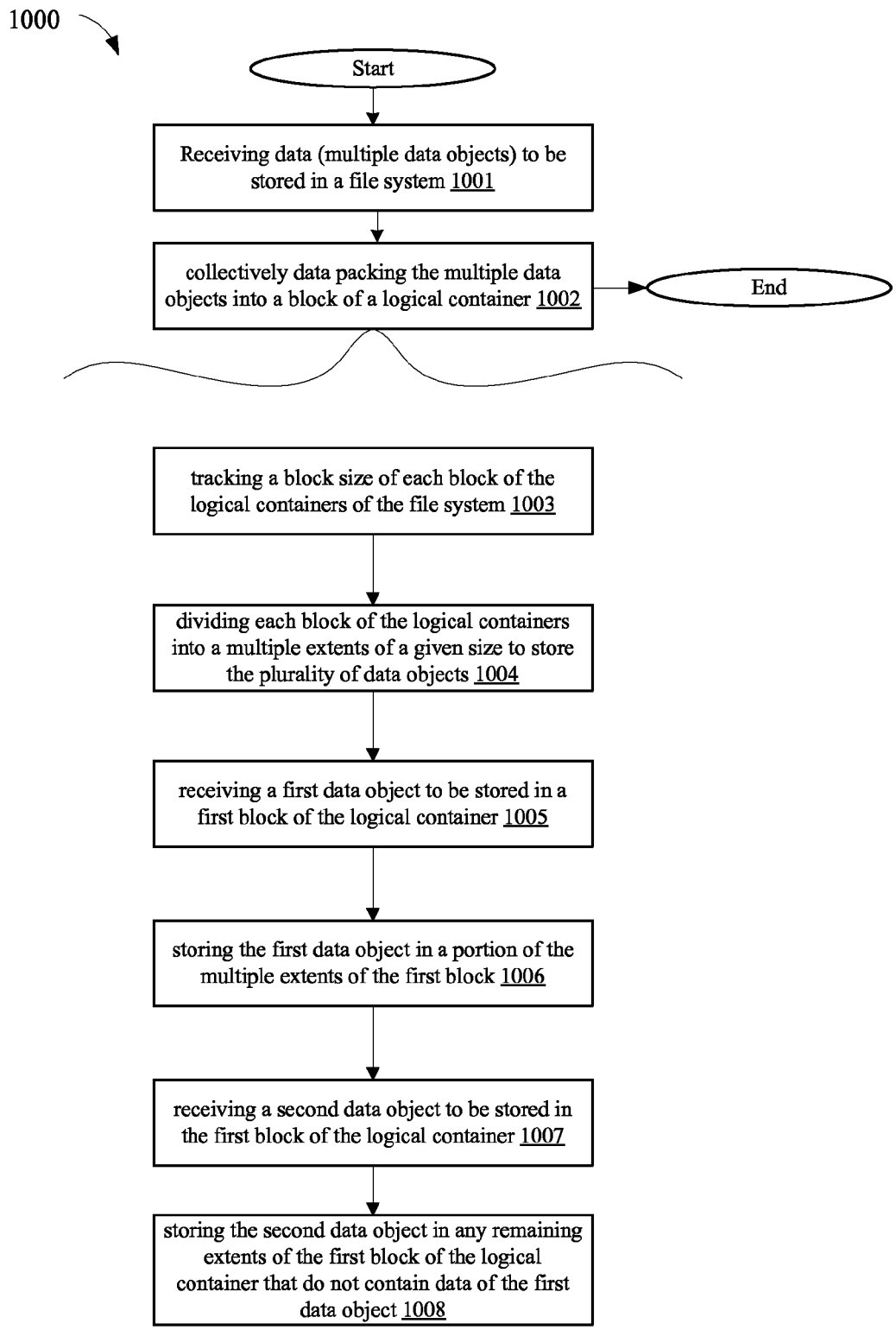
FIG. 10 illustrates a flow chart of one embodiment of collectively data packing multiple data objects into a logical container.

FIG. 10 illustrates a flow chart of one embodiment of operating a storage server. Method 1000 includes, first, receiving data, in the form of data objects (e.g., one data object per file), to be stored in a file system, operation 1001. Next, the method 1000 includes collectively data packing the multiple data objects into multiple extents of a block of a logical container, operation 1002. The block is a fundamental unit of storage space of file system, and each block includes multiple extents to store at least one data object. The block has a block size according to the internal block size of the file system. In one embodiment, operation 1002 includes the operations of tracking a block size of each block of the logical containers in the file system, operation 1003, and dividing each block of the logical containers into multiple extents of a given size to store the plurality of data objects, operation 1004. The extent size is smaller than the block size. In one embodiment, the extent size may be in bytes as a power of two. Alternatively, other extent sizes may be used.

The operation 1002 may also include receiving a first data object to be stored in multiple extents of a first block of the logical container, operation 1005, and storing the first data object in a portion of the multiple extents of the first block, operation 1006. The first data object may be stored in the portion of the multiple extents of the first block as if the portion of the multiple extents of the first block were a single block in the file system having a current block size that is smaller than the block. The method may further include tracking a physical location of the first data object in the first block of the logical container using one or more metadata files.

The operation 1002 may also include receiving a second data object to be stored in the remaining extents of the first block of the logical container, operation 1007, and storing the second data object in any remaining extents of the first block of the logical container that do not contain data of the first data object, operation 1008.

The operation 1002 may further include storing any remaining portion of the data of the second data object that is not stored in the remaining extents of the first bock into a portion of the plurality of extents of a second block of the logical container. If the second data object is stored only in the first data block, then the method includes tracking the physical location of the second data object in the first block of the logical container. However, if the second data object is stored partially in the first data block and partially in the second data block, then the method includes tracking the second data object using one or more metadata files. The method may further include tracking the physical location of the second data object in the first and second blocks of the logical container using one or more metadata files. In other embodiments, the data objects are large enough to span multiple blocks.

Figure 11:
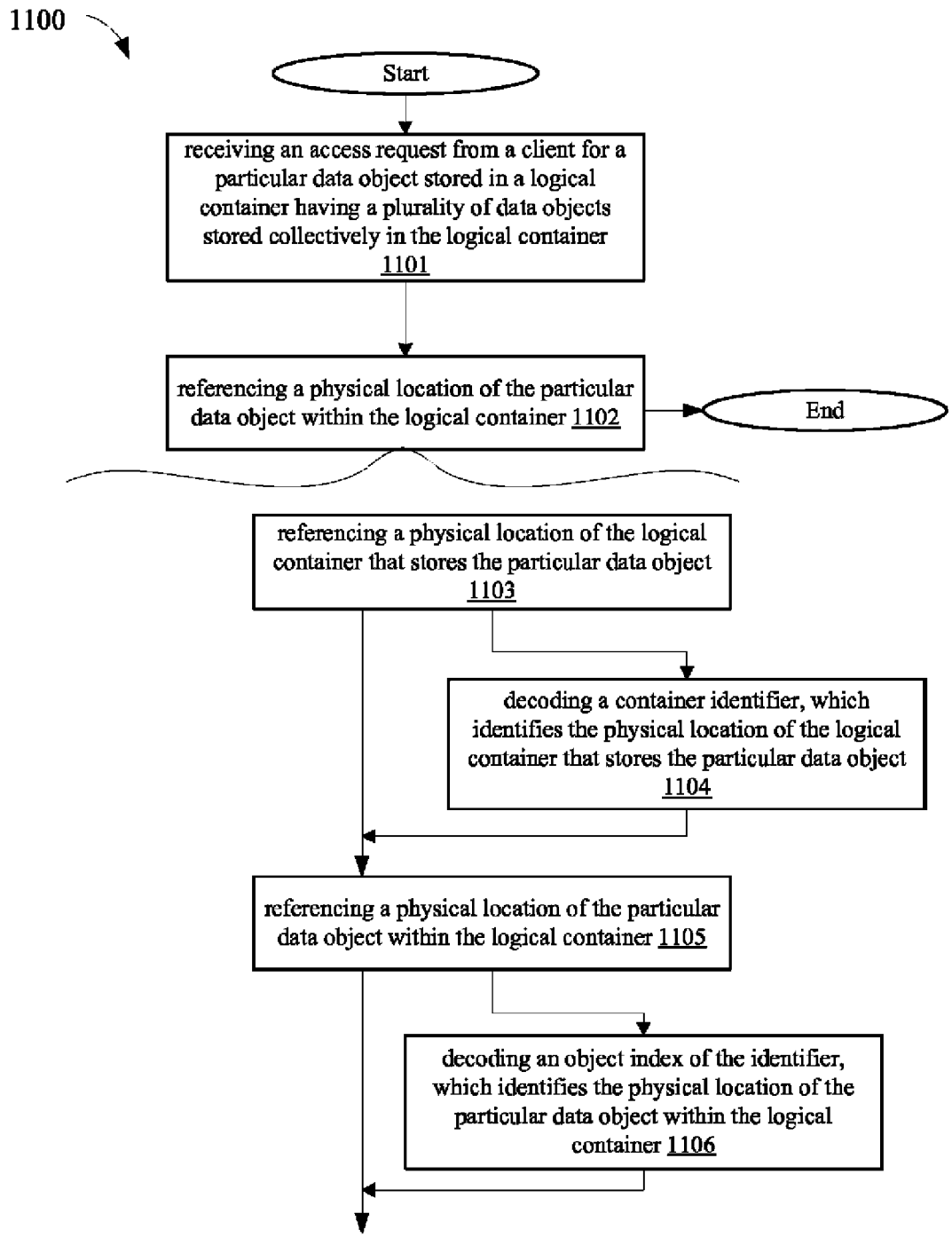
FIG. 11 illustrates a flow chart of one embodiment of referencing a physical location of a particular data object within a logical container.

FIG. 11 illustrates a flow chart of one embodiment of referencing a physical location of a particular data object within extents of a logical container. Method 1100 includes receiving an access request from a client for a particular data object stored in a logical container having a plurality of data objects stored collectively in the logical container, operation 1101, and referencing a physical location of the particular data object within the logical container, operation 1102. This may be done using an identifier. Referencing the physical location of the particular data object may further include referencing a physical location of the logical container that stores the particular data object, operation 1103. This may be done by decoding a container identifier, which identifies the physical location of the logical container that stores the particular data object, operation 1104. Referencing the physical location of the particular data object may further include referencing a physical location of the particular data object within the logical container, operation 1105. This may be done by decoding an object index of the identifier, which identifies the physical location of the particular data object within the logical container, operation 1106. In one embodiment, the method may include accessing a container map to determine the physical location of the logical container, and accessing an object map in the logical container to determine the physical location of the particular data object within the logical container.

Figure 12:
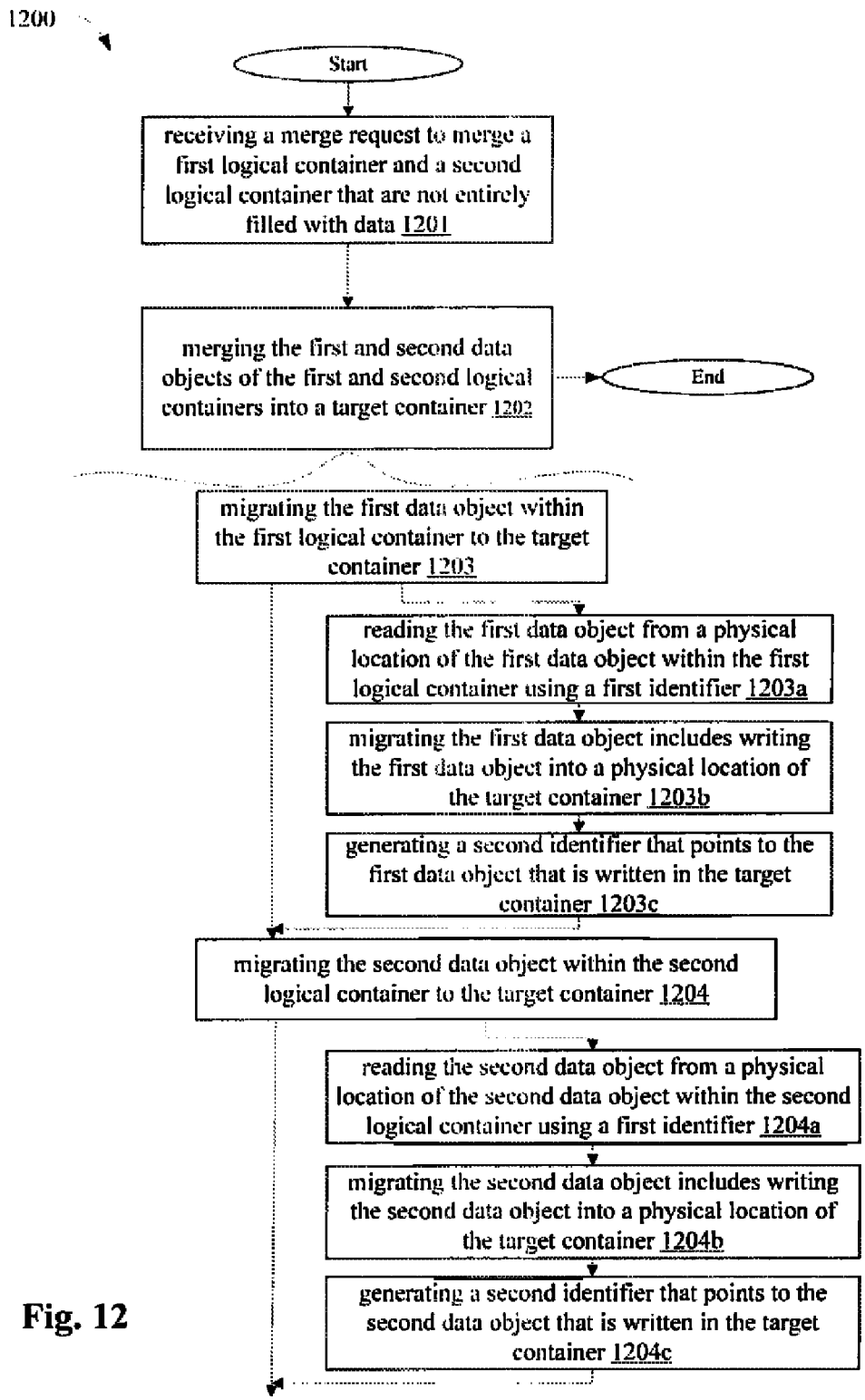
FIG. 12 illustrates a flow chart of one embodiment of merging two logical containers that are not entirely filled with data.

FIG. 12 illustrates a flow chart of one embodiment of merging two logical containers that are not entirely filled with data. Method 1200 includes receiving a merge request to merge a first logical container and a second logical container that are not entirely filled with data, operation 1201, and merging a first data object and a second data object of the first and second logical containers into a target container, operation 1202. In one embodiment, the target container is either the first or second logical containers. In another embodiment, the target container is a third logical container. The target container is configured to store multiple data objects within the target container. In some embodiments, all of the data objects from the first and second logical containers are merged into the target container. In other embodiments, not all of the data objects from the first and second logical containers are merged into the target container. In one embodiment, the instruction to merge or repack containers includes a list of data objects to be merged or copied to the target container. In another embodiment, the instruction to merge or repack containers includes a list of data objects to be omitted from the merging of containers or from the copy operation.

The operation of merging the first and second data objects of operation 1202 may include migrating the first data object within the first logical container to the target container, operation 1203. Migrating the first data object may include, first, reading the first data object from a physical location of the first data object within the first logical container using a first identifier, operation 1203a. Next, migrating the first data object includes writing the first data object into a physical location of the target container, operation 1203b. Lastly, migrating the first data object includes generating a second identifier that points to the first data object that is written in the target container, operation 1203c.

The operation of merging the first and second data objects of operation 1202 may also include migrating the second data object within the second logical container to the target container, operation 1204. Migrating the second data object may include, first, reading the second data object from a physical location of the second data object within the second logical container using a first identifier, operation 1204a. Next, migrating the second data object includes writing the second data object into a physical location of the target container, operation 1204b. Lastly, migrating the second data object includes generating a second identifier that points to the second data object that is written in the target container, operation 1204c.

The method may also include marking the first identifier of the first and second data objects within the first and second logical containers as being migrated to the target container. The read (or write) operation may be performed by decoding the first identifier (or second identifier) of the first or second data objects to reference the physical location of the first or second data objects with their respective containers. Decoding the first identifier (or second identifier) may include decoding a logical container identifier of the first identifier to locate the physical location of the container within which the data object is stored, and decoding a logical object index value of the first identifier (or second identifier) to locate a start of the first data object within the respective container.

In one embodiment, the method of merging the data of the first and second logical containers includes making a dual entry in a container map to point to a physical location of the first container and a physical location of the target container. Making a dual entry allows all write access requests to the identifier of the first data object to be mirrored to the physical locations of the first data object within the first logical container and within the target container.

In another embodiment, the method includes backing up the target container and not the first and second logical containers after merging the data of the first and second logical containers into the target container.

As described above, a container can be repacked to consolidate space, hole punch, or the like. However, in another embodiment, when merging the contents of two containers, containers A and B, into one container, such as container B, repacking of container B can be performed to create holes of an appropriate size to optimize placement of data objects from container A within container B.

It should also be noted that the embodiments described herein are not limited to merging of two containers. Multiple containers may be merged using the embodiments described herein. Similarly, the embodiments described herein are not limited to storing two data objects in a container. One or more data objects may be stored on an extent basis in one or more blocks of the logical containers.

Embodiments of the present invention include various operations, as described above. These operations may be performed by hardware components, software, firmware, or a combination thereof. The various operations may be performed by executing one or more computer programs to perform functions of the embodiments by operating on input data and generating output data. The various operations may also be implemented in, for example, special purpose logic circuitry, e.g., a field programmable gate array (FPGA), digital signal processor (DSP), Application-specific integrated circuit (ASIC), programmable logic device (PLD), or the like). Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as one or more computer program products. The one or more computer programs may be tangibly embodied in an information carrier, e.g., in a machine-readable storage device or in a propagated signal, for execution by, or to control the operation of, one or more general-purpose or special-purpose processors to perform the described operations. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM disks); digital video disk (DVD) ROM disks, magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The processing device(s) described herein may include one or more general-purpose processing devices such as a microprocessor or central processing unit, a controller, or the like. Alternatively, the digital processing device may include one or more special-purpose processing devices such as a DSP, an ASIC, an FPGA, or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
receiving a merge request to merge a first logical container and a second logical container, wherein the first logical container includes a first data object and the second logical container includes a second data object, wherein each logical container comprises at least one block wherein the first and second data objects are stored at a block level in the first and second logical containers respectively in an existing file system whose internal block fragmentation dictates the size of each block;
merging the first and second data objects of the first and second logical containers into a target container, wherein the target container comprises at least one block having a plurality of extents to store data objects, wherein the first and second data objects are stored at an extent level within the target container after said merging, wherein the extent is a smaller unit of storage space than the block, and wherein merging the data comprises separately referencing the first logical container, the second logical container, the target container, the first data object, and the second data object in response to the merge request;
updating a container map to indicate that the first data object and the second data object are stored in the target container, wherein the container map includes a plurality of mapping entries that map filenames to data object identifiers, wherein each of the data object identifiers identifies a corresponding data object and includes:
a container identifier that specifies a logical container in which that corresponding data object is stored; and
an object index value used to identify which of one or more data objects stored in that logical container is that corresponding data object; and
updating an object map stored within the target container to indicate extent locations within the target container of the first data object and the second data object, wherein the object map comprises a listing of a plurality of data objects stored in the target container and extent locations within the target container where the plurality of data objects are stored.

2. The method of claim 1, wherein the target container is one of the first and second logical containers.

3. The method of claim 1, wherein the target container is a third logical container.

4. The method of claim 1, wherein merging the data of the first and second containers comprises:
migrating the first data object within the first logical container to the target container; and
migrating the second data object within the second logical container to the target container.

5. The method of claim 4, wherein migrating the first data object comprises:
reading the first data object from a physical location of the first data object within the first logical container using a first identifier;
writing the first data object into a physical location of the target container; and
generating a second identifier that points to the first data object that is written in the target container.

6. The method of claim 5, further comprising marking the first identifier of the first data object within the first logical container as being migrated to the target container.

7. The method of claim 5, wherein reading the first object from the physical location within the first logical container comprises decoding the first identifier of the first data object to reference the physical location of the first data object within the first logical container.

8. The method of claim 7, wherein decoding the first identifier of the first data object comprises:
decoding a container identifier of the first identifier to locate the physical location of the first logical container within which the first data object is stored; and
decoding an object index value of the first identifier to locate a start of the first data object within the first logical container.

9. The method of claim 5, wherein writing the first data object to the physical location within the target container comprises decoding the second identifier of the first data object to reference the physical location where the first data object is to be written within the target container.

10. The method of claim 9, wherein decoding the second identifier of the first data object comprises:
  decoding a container identifier of the second identifier to locate the physical location of the target container within which the first data object is to be written; and
  decoding an object index value of the second identifier to locate a start of the first data object within the second logical container.

11. The method of claim 4, wherein migrating the second data object comprises:
  reading the second data object from a physical location of the second data object within the second logical container using a first identifier;
  writing the second data object into a physical location of the target container; and
  generating a second identifier that points to the second data object that is written in the target container.

12. The method of claim 11, further comprising marking the first identifier of the second data object within the second logical container as being migrated to the target container.

13. The method of claim 1, wherein merging the first and second logical containers further comprises making a dual entry in the container map to point to a physical location of the first logical container and a physical location of the target container, and wherein all write access requests to the identifier of the first data object that is located in the first logical container is mirrored in the physical locations of the first data object within the first logical container and within the target container.

14. The method of claim 1, further comprising backing up the target container and not the first and second logical containers after merging the data of the first and second logical containers into the target container.

15. A storage server, comprising:
  a processor;
  a first communication interface through which to communicate with a plurality of storage devices;
  a second communication interface through which to communicate with a client of the storage server;
  a file system; and
  a memory storing instructions which configure the processor to merge data of a first logical container and a second logical container into a target container that includes at least one block that includes a plurality of extents to store data objects, by:
    migrating a first data object within the first logical container to a first physical location of the target container;
    migrating a second data object within the second logical container to a second physical location of the target container, wherein, before the merge, the first and second data objects are stored at a block level in the first and second logical containers respectively in an existing file system whose internal block fragmentation dictates the size of each block, and wherein, after the merge, the first and second data objects are stored at an extent level within the target container after said merging, wherein the extent is a smaller unit of storage space than the block;
    updating a container map to indicate that the first data object and the second data object are stored in the target container, wherein the container map includes a plurality of mapping entries that map filenames to data object identifiers, wherein each of the data object identifiers identifies a corresponding data object and includes:
      a container identifier to specify a logical container in which that corresponding data object is stored; and
      an object index value used to identify which of one or more data objects stored in that logical container is that corresponding data object; and
    updating an object map stored within the target container to indicate extent locations within the target container of the first data object and the second data object, wherein the object map comprises a listing of a plurality of data objects stored in the target container and extent locations within the target container where the plurality of data objects are stored.

16. The storage server of claim 15, wherein the target container is one of the first and second logical containers.

17. The storage server of claim 15, wherein the target container is a third logical container.

18. The storage server of claim 15, wherein migrating the first data object comprises:
  reading the first data object from a physical location of the first data object within the first logical container using a first identifier;
  writing the first data object into a physical location of the target container; and
  generating a second identifier that points to the first data object that is written in the target container.

19. The storage server of claim 18, wherein reading the first object from the physical location within the first logical container comprises:
  decoding a container identifier of the first identifier to locate the physical location of the first logical container within which the first data object is stored; and
  decoding an object index value of the first identifier to locate a start of the first data object within the first logical container.

20. The storage server of claim 15, wherein migrating the second data object comprises:
  reading the second data object from a physical location of the second data object within the second logical container using a first identifier;
  writing the second data object into a physical location of the target container; and
  generating a second identifier that points to the second data object that is written in the target container.

21. The storage server of claim 20, wherein writing the first data object to the physical location within the target container comprises:
  decoding a container identifier of the second identifier to locate the physical location of the target container within which the first data object is to be written; and
  decoding an object index value of the second identifier to locate a start of the first data object within the second logical container.

22. An article of manufacture comprising one or more non-transitory storage media storing instructions which, when executed by a system, cause the system to perform operations comprising:
  identifying within a file system a first logical container and a second logical container for merging, wherein the second logical container includes at least one block and has some empty storage space, and wherein each block comprises a plurality of extents to store data objects;
  referencing the physical location of data objects stored at a block level in the first and second logical containers in the file system whose internal block fragmentation dictates the size of each block; and migrating the data object stored in the first logical container into the empty storage space of the second logical container, wherein the data objects stored in the second logical container are stored at an extent level within the second logical container after said migrating, wherein the extent is a smaller unit of storage space than the block, and wherein migrating further comprises:

updating an object map stored within the second logical container, wherein the object map comprises a listing of a plurality of data objects stored in the second logical container and extent locations within the second logical container where the plurality of data objects are stored; and updating a container map to indicate that the data object is stored in the second logical container, wherein the container map includes a plurality of mapping entries that map filenames to data object identifiers, wherein each of the data object identifiers identifies a corresponding data object and includes:

a container identifier that specifies a logical container in which that corresponding data object is stored; and an object index value used to identify which of the one or more data objects stored in that logical container is that corresponding data object.

23. The article of claim 22, wherein the one or more migrated data objects each comprise an object index value represented in an object map in the second logical container and a physical location within the second logical container.

24. The article of claim 22, wherein migrating the one or more data objects of the first logical container into empty space of the second logical container comprises:

reading a first data object from a physical location of the first logical container using a container identifier in the container map; and writing the first data object to a physical location within the second logical container that corresponds to the empty storage space.

25. An apparatus, comprising:

a storage server to store a plurality of data objects in a file system comprising a processor coupled to a memory, wherein the plurality of data objects are stored at a block level in the file system whose internal block fragmentation dictates the size of each block, wherein the storage server is configured to merge the plurality of data objects into a target container from a plurality of logical containers that store the plurality of data objects, one data object per each logical container, wherein the target container comprises at least one block, and wherein each block of the target container comprises a plurality of extents to store data objects, wherein the plurality of data objects are stored at an extent level after the merge, wherein the extent is a smaller unit of storage space than the block, wherein the target container contains an object map, wherein the object map comprises a listing of a plurality of data objects stored in the target container and extent locations within the target container where the plurality of data objects are stored, and wherein the storage server is further configured to update a container map to indicate that the merged plurality of data objects are stored in the target container, wherein the container map includes a plurality of mapping entries that map filenames to data object identifiers, wherein each of the data object identifiers identifies a corresponding data object and includes:

a container identifier that specifies a logical container in which that corresponding data object is stored, and an object index value used to identify which of the one or more data objects stored in that logical container is that corresponding data object.

26. The apparatus of claim 25, wherein the target container is one block in size.

27. The apparatus of claim 25, wherein the container map includes a plurality of mapping entries with different filenames mapped to data object identifiers including a same container identifier.

* * * * *